United States Patent
Caterina et al.

(10) Patent No.: US 9,392,646 B2
(45) Date of Patent: *Jul. 12, 2016

(54) PALLET WARMER HEATING UNIT

(75) Inventors: Thomas Caterina, Boise, ID (US); David Naylor, Draper, UT (US)

(73) Assignee: 417 and 7/8, LLC, Park City, UT (US)

( * ) Notice: Subject to any disclaimer, the term of this patent is extended or adjusted under 35 U.S.C. 154(b) by 922 days.

This patent is subject to a terminal disclaimer.

(21) Appl. No.: 12/433,974

(22) Filed: May 1, 2009

(65) Prior Publication Data

US 2009/0302027 A1  Dec. 10, 2009

Related U.S. Application Data

(63) Continuation-in-part of application No. 12/258,240, filed on Oct. 24, 2008, which is a continuation-in-part of application No. 11/835,641, filed on Aug. 8, 2007, now abandoned, which is a continuation-in-part of (Continued)

(51) Int. Cl.
*H05B 1/00* (2006.01)
*H05B 3/36* (2006.01)
(Continued)

(52) U.S. Cl.
CPC ............... *H05B 3/36* (2013.01); *F24D 13/024* (2013.01); *H05B 1/0275* (2013.01); *H05B 2203/003* (2013.01); *H05B 2203/014* (2013.01); *Y02B 30/26* (2013.01)

(58) Field of Classification Search
CPC ...... H05B 2203/014; H05B 3/36; H05B 3/06; F24D 13/024
USPC ......... 219/211–213, 489–492, 494, 525, 531, 219/528, 529
See application file for complete search history.

(56) References Cited

U.S. PATENT DOCUMENTS 1,455,287 A  5/1923  Hadley
1,455,297 A  5/1923  Lyons et al.
(Continued)

FOREIGN PATENT DOCUMENTS

CA  2210086  7/1996
CA  2598030  8/2006
(Continued)

OTHER PUBLICATIONS

U.S. Appl. No. 12/875,313, filed Sep. 3, 2010, Naylor.
(Continued)

*Primary Examiner* — Phuong Nguyen
(74) *Attorney, Agent, or Firm* — Workman Nydegger

(57) ABSTRACT

A heating unit for use in heating pallets full of materials includes wall modules and a lid module. The modules include cover layers. Each module may include a heating component disposed between the cover layers and which is configured to convert electrical energy to heat energy and to distribute the heat energy. The heating component includes a heat generating element for converting electrical current to heat energy and a heat spreading element comprising carbon thermally coupled to the heat generating element. The modules may further include a thermal insulation layer. The modules may also include a receiving power connector electrically connected to the heat generating element. The modules may include a seam or hinge formed in a fashion that facilitates folding of the modules in a fashion which allows support members to support a module on an edge of the module.

20 Claims, 9 Drawing Sheets

Related U.S. Application Data application No. 11/744,163, filed on May 3, 2007, now abandoned, which is a continuation-in-part of application No. 11/218,156, filed on Sep. 1, 2005, now Pat. No. 7,230,213, application No. 12/433,974, which is a continuation-in-part of application No. 12/119,434, filed on May 12, 2008, now Pat. No. 8,258,443, which is a continuation-in-part of application No. 11/422,580, filed on Jun. 6, 2006, now Pat. No. 7,880,121, which is a continuation-in-part of application No. 11/218,156, and a continuation-in-part of application No. 11/344,830, filed on Jan. 1, 2006, now Pat. No. 7,183,524, which is a continuation-in-part of application No. 11/218,156.

(60) Provisional application No. 60/688,146, filed on Jun. 6, 2005, provisional application No. 60/654,702, filed on Feb. 17, 2005, provisional application No. 60/656,060, filed on Feb. 23, 2005, provisional application No. 60/688,146, filed on Jun. 6, 2005, provisional application No. 60/654,702, filed on Feb. 17, 2005, provisional application No. 60/656,060, filed on Feb. 23, 2005, provisional application No. 60/688,146, filed on Jun. 6, 2005.

(51) Int. Cl.
*F24D 13/02* (2006.01)
*H05B 1/02* (2006.01)

(56) References Cited

U.S. PATENT DOCUMENTS

| | | | | |
|---|---|---|---|---|
| 1,486,412 | A | 3/1924 | Biddlecom | |
| 2,014,657 | A * | 9/1935 | Marshall et al. | 219/385 |
| 2,342,077 | A * | 2/1944 | Jepson | 219/490 |
| 2,550,040 | A * | 4/1951 | Clar | 165/63 |
| 2,619,580 | A | 11/1952 | Pontiere | |
| 2,666,840 | A | 1/1954 | Poirier | |
| 2,697,163 | A * | 12/1954 | Spear | 392/364 |
| 2,706,237 | A * | 4/1955 | Hare et al. | 219/390 |
| 2,717,766 | A * | 9/1955 | Becker | 165/61 |
| 2,745,942 | A | 5/1956 | Cohen | |
| 2,779,526 | A * | 1/1957 | Vogt | 229/221 |
| 2,870,319 | A * | 1/1959 | Ford | 392/347 |
| 2,875,316 | A * | 2/1959 | Ford et al. | 219/473 |
| 2,907,859 | A * | 10/1959 | Walkoe | 219/412 |
| 2,963,565 | A * | 12/1960 | Moore et al. | 219/530 |
| 3,040,925 | A * | 6/1962 | Mills | 220/1.5 |
| 3,065,325 | A * | 11/1962 | Schlaich | 219/489 |
| 3,108,173 | A * | 10/1963 | Barrett et al. | 99/389 |
| 3,119,000 | A * | 1/1964 | Loch et al. | 219/413 |
| 3,130,289 | A | 4/1964 | Katzman | |
| 3,176,118 | A * | 3/1965 | Scott | 219/394 |
| 3,233,097 | A | 2/1966 | Watkins | 246/428 |
| 3,345,497 | A * | 10/1967 | Porteous | 219/417 |
| 3,348,470 | A * | 10/1967 | Swanson | 99/331 |
| 3,380,087 | A | 4/1968 | Petty et al. | |
| 3,417,229 | A | 12/1968 | Shomphe | |
| 3,438,069 | A | 4/1969 | Long | |
| 3,454,746 | A | 7/1969 | Dubois | |
| 3,510,547 | A | 5/1970 | Eisler | |
| 3,516,485 | A * | 6/1970 | Mackay et al. | 165/265 |
| 3,649,725 | A | 3/1972 | Olson | |
| 3,659,077 | A | 4/1972 | Olson | |
| 3,662,512 | A * | 5/1972 | Zelnick | 53/442 |
| 3,691,343 | A | 9/1972 | Norman | |
| 3,694,622 | A | 9/1972 | Bentley | |
| 3,723,708 | A * | 3/1973 | Tulkoff | 219/385 |
| 3,729,614 | A | 4/1973 | Martinet | |
| 3,782,628 | A * | 1/1974 | Beaudet | 237/12.3 C |
| 3,812,320 | A | 5/1974 | Borgren | |
| 3,852,569 | A * | 12/1974 | Potvin | 219/525 |
| 3,868,825 | A | 3/1975 | Boyce | |
| 3,881,091 | A * | 4/1975 | Day | 219/489 |
| 3,896,288 | A * | 7/1975 | Tulkoff | 53/442 |
| 3,897,928 | A | 8/1975 | Eisler | |
| 3,938,431 | A * | 2/1976 | Potvin | 99/425 |
| 3,968,348 | A | 7/1976 | Stanfield | |
| 3,988,791 | A | 11/1976 | Simon | |
| 4,000,815 | A | 1/1977 | Wingbro | |
| 4,060,710 | A | 11/1977 | Reuter | |
| 4,091,266 | A | 5/1978 | Ito | |
| 4,238,105 | A | 12/1980 | West | |
| 4,239,956 | A * | 12/1980 | Morton | 392/402 |
| 4,244,411 | A | 1/1981 | Karlstrom | |
| 4,250,397 | A | 2/1981 | Gray | |
| 4,250,398 | A | 2/1981 | Ellis | |
| 4,303,074 | A | 12/1981 | Bender | |
| 4,316,080 | A | 2/1982 | Wroblewski | |
| 4,401,880 | A * | 8/1983 | Eizenhoefer | 219/213 |
| 4,423,694 | A | 1/1984 | Senneville | |
| 4,457,491 | A | 7/1984 | Dudman | |
| 4,485,297 | A | 11/1984 | Grise | |
| 4,535,222 | A * | 8/1985 | Moen | 219/401 |
| 4,542,282 | A * | 9/1985 | Brasky | 392/435 |
| 4,549,069 | A | 10/1985 | Oge | |
| 4,607,154 | A | 8/1986 | Mills | |
| 4,625,394 | A * | 12/1986 | Kemnitz et al. | 29/611 |
| 4,773,105 | A * | 9/1988 | Toyoshima | 4/526 |
| 4,810,859 | A | 3/1989 | Anabtawi | |
| 4,832,881 | A | 5/1989 | Arnold | |
| 4,855,573 | A * | 8/1989 | Vercillo et al. | 219/492 |
| 4,899,031 | A | 2/1990 | Dyer | |
| 4,901,266 | A | 2/1990 | Takagi | |
| 4,919,270 | A * | 4/1990 | Govang et al. | 206/597 |
| 4,919,744 | A | 4/1990 | Newman | |
| 4,922,084 | A | 5/1990 | Hutter | |
| 4,931,627 | A | 6/1990 | Watts | |
| 4,935,602 | A | 6/1990 | Bravo | |
| 4,967,057 | A * | 10/1990 | Bayless et al. | 219/213 |
| 4,967,097 | A | 10/1990 | Mehl | |
| 5,005,531 | A | 4/1991 | Nelson | |
| 5,049,724 | A | 9/1991 | Anderson | |
| 5,181,006 | A | 1/1993 | Shafe | |
| 5,198,063 | A | 3/1993 | Howard | |
| 5,201,868 | A * | 4/1993 | Johnson | 229/103.11 |
| 5,309,981 | A * | 5/1994 | Binder | 165/64 |
| 5,371,340 | A * | 12/1994 | Stanfield | 219/217 |
| 5,397,875 | A * | 3/1995 | Bechtold, Jr. | 219/521 |
| 5,451,747 | A | 9/1995 | Sullivan | |
| 5,499,621 | A | 3/1996 | Trihey | |
| 5,550,350 | A | 8/1996 | Barnes | |
| 5,557,704 | A | 9/1996 | Dennis et al. | |
| 5,590,478 | A | 1/1997 | Furness | |
| 5,591,365 | A | 1/1997 | Shields | |
| 5,601,143 | A * | 2/1997 | Binder | 165/61 |
| 5,601,232 | A * | 2/1997 | Greenlee | 229/117.05 |
| 5,614,292 | A | 3/1997 | Saylor | |
| 5,669,221 | A | 9/1997 | LeBleu | |
| 5,684,689 | A | 11/1997 | Hahn | |
| 5,704,487 | A * | 1/1998 | Taravella et al. | 206/596 |
| 5,780,367 | A | 7/1998 | Handwerker | |
| 5,824,996 | A | 10/1998 | Kochman | |
| 5,827,050 | A | 10/1998 | Price | |
| 5,830,809 | A | 11/1998 | Howard | |
| 5,854,470 | A | 12/1998 | Silva | |
| 5,887,119 | A | 3/1999 | Wesseltoft | |
| 5,918,744 | A * | 7/1999 | Bringard et al. | 206/596 |
| 5,946,933 | A * | 9/1999 | Clarke et al. | 62/408 |
| 5,974,820 | A | 11/1999 | Boyd | |
| 5,974,830 | A | 11/1999 | Colero | |
| 5,986,243 | A | 11/1999 | Campf | |
| 5,990,454 | A * | 11/1999 | Westerberg et al. | 219/411 |
| 5,994,669 | A * | 11/1999 | McCall | 219/209 |
| 6,051,811 | A | 4/2000 | Hardison | |
| 6,051,812 | A | 4/2000 | Walker | |
| 6,057,530 | A | 5/2000 | Gurevich | |
| 6,160,246 | A | 12/2000 | Rock et al. | |
| 6,180,929 | B1 | 1/2001 | Pearce | |
| 6,184,496 | B1 | 2/2001 | Pearce | |
| 6,189,487 | B1 * | 2/2001 | Owen et al. | 119/28.5 |

(56) References Cited

U.S. PATENT DOCUMENTS

| | | | |
|---|---|---|---|
| 6,202,849 B1 * | 3/2001 | Graham | 206/524.8 |
| 6,211,493 B1 | 4/2001 | Bouman | |
| 6,222,160 B1 | 4/2001 | Remke | |
| 6,245,400 B1 | 6/2001 | Tzeng | |
| 6,279,856 B1 | 8/2001 | Rutherford | |
| 6,294,761 B1 | 9/2001 | Diederich | |
| 6,294,768 B1 | 9/2001 | Liebich | |
| 6,303,905 B1 | 10/2001 | Chiles | |
| 6,330,986 B1 | 12/2001 | Rutherford | |
| 6,392,209 B1 | 5/2002 | Oppitz | |
| 6,426,488 B2 | 7/2002 | Schielke | |
| 6,426,489 B1 | 7/2002 | Elsasser | |
| 6,432,336 B1 | 8/2002 | Mercuri | |
| 6,452,138 B1 | 9/2002 | Kochman | |
| 6,482,520 B1 | 11/2002 | Tzeng | |
| 6,483,087 B2 | 11/2002 | Gardner | |
| 6,503,626 B1 | 1/2003 | Norley | |
| 6,550,645 B2 * | 4/2003 | Nelson et al. | 222/105 |
| 6,614,992 B2 * | 9/2003 | Schmitt | 392/435 |
| 6,631,603 B2 | 10/2003 | Zornes | |
| 6,657,170 B2 | 12/2003 | Clothier | |
| 6,664,520 B2 | 12/2003 | Clothier | |
| 6,667,100 B2 | 12/2003 | Rutherford | |
| 6,673,284 B2 | 1/2004 | Mercuri | |
| 6,673,289 B2 | 1/2004 | Reynolds | |
| 6,675,723 B2 * | 1/2004 | Sukeva | 108/55.1 |
| 6,687,927 B1 * | 2/2004 | Tharalson et al. | 5/98.1 |
| 6,740,381 B2 | 5/2004 | Day | |
| 6,746,768 B2 | 6/2004 | Greinke | |
| 6,770,848 B2 | 8/2004 | Haas et al. | |
| 6,782,640 B2 | 8/2004 | Westin | |
| 6,797,251 B1 | 9/2004 | Bennett | |
| 6,822,198 B2 * | 11/2004 | Rix | 219/386 |
| 6,841,250 B2 | 1/2005 | Tzeng | |
| 6,841,757 B2 | 1/2005 | Marega et al. | |
| 6,848,200 B1 | 2/2005 | Westin | |
| 6,855,915 B2 | 2/2005 | Gehring | |
| 6,886,233 B2 | 5/2005 | Rutherford | |
| 6,897,417 B1 | 5/2005 | Usselman | |
| 6,931,756 B2 | 8/2005 | Morgan | |
| 6,943,320 B1 | 9/2005 | Bavett | |
| 6,982,874 B2 | 1/2006 | Smalc | |
| 7,049,559 B2 | 5/2006 | Ishii | |
| 7,108,055 B2 | 9/2006 | Krassowski | |
| 7,161,809 B2 | 1/2007 | Ford | |
| 7,166,912 B2 | 1/2007 | Tzeng | |
| 7,182,222 B2 | 2/2007 | Prabucki | |
| 7,183,524 B2 | 2/2007 | Naylor | |
| 7,186,309 B2 | 3/2007 | Mercuri | |
| 7,230,213 B2 | 6/2007 | Naylor | |
| 7,232,601 B2 | 6/2007 | Mercuri | |
| 7,285,748 B2 | 10/2007 | Nelson et al. | |
| 7,393,577 B2 | 7/2008 | Day | |
| 7,393,587 B2 | 7/2008 | Krassowski | |
| 7,880,121 B2 * | 2/2011 | Naylor | 219/213 |
| 7,975,879 B2 | 7/2011 | Groesbeck | |
| 2002/0164483 A1 | 11/2002 | Mercuri | |
| 2003/0052114 A1 | 3/2003 | Ek | |
| 2003/0080114 A1 | 5/2003 | Harashima | |
| 2003/0085215 A1 | 5/2003 | Rix | |
| 2003/0097763 A1 | 5/2003 | Morgan | |
| 2003/0111457 A1 | 6/2003 | Tidrick | |
| 2003/0154736 A1 | 8/2003 | Lloyd | |
| 2003/0155347 A1 * | 8/2003 | Oh et al. | 219/545 |
| 2003/0164361 A1 | 9/2003 | Marega et al. | |
| 2004/0004066 A1 | 1/2004 | Evans | |
| 2004/0025784 A1 | 2/2004 | Kawamura | |
| 2004/0035853 A1 * | 2/2004 | Pais | 219/548 |
| 2004/0221529 A1 | 11/2004 | Zornes | |
| 2004/0226309 A1 * | 11/2004 | Broussard | 62/236 |
| 2005/0160620 A1 | 7/2005 | Morgan | |
| 2006/0289000 A1 * | 12/2006 | Naylor | 126/96 |
| 2006/0289426 A1 * | 12/2006 | Naranjo et al. | 219/385 |
| 2006/0289468 A1 | 12/2006 | Seibert | |
| 2007/0181561 A1 | 8/2007 | Turletes | |
| 2007/0262073 A1 | 11/2007 | Naylor | |
| 2008/0277417 A1 | 11/2008 | Groesbeck | |
| 2009/0101305 A1 * | 4/2009 | Clark | 165/53 |
| 2009/0107975 A1 * | 4/2009 | Caterina et al. | 219/213 |
| 2009/0302023 A1 | 12/2009 | Caterina | |
| 2011/0006080 A1 | 1/2011 | Naylor | |
| 2011/0174802 A1 | 7/2011 | Naylor | |
| 2011/0266287 A1 | 11/2011 | Groesbeck | |
| 2012/0328274 A1 | 12/2012 | Naylor | |
| 2013/0001217 A1 | 1/2013 | Naylor | |

FOREIGN PATENT DOCUMENTS

| | | | |
|---|---|---|---|
| CA | 2598045 | | 8/2006 |
| CA | 2685387 | | 11/2008 |
| CA | 2680555 | | 3/2010 |
| CA | 2684115 | | 5/2010 |
| CA | 2684178 | | 5/2010 |
| GB | 1387409 A | * | 3/1975 |
| JP | 04350257 | | 12/1992 |
| JP | 2001123667 | | 5/2001 |
| JP | 06129095 | | 5/2004 |
| WO | 2006088710 | | 8/2006 |
| WO | 2008137726 | | 11/2008 |
| WO | 2008137727 | | 11/2008 |
| WO | 2009140194 | | 11/2009 |
| WO | 2012170013 | | 12/2012 |

OTHER PUBLICATIONS

U.S. Appl. No. 12/258,249, filed Mar. 7, 2012, Office Action.
U.S. Appl. No. 12/875,305, filed Mar. 8, 2012, Office Action.
U.S. Appl. No. 12/258,240, filed Mar. 14, 2012, Office Action.
U.S. Appl. No. 12/264,480, filed Mar. 14, 2012, Office Action.
U.S. Appl. No. 12/119,434, filed Jun. 14, 2011, Notice of Allowance.
U.S. Appl. No. 12/212,529, filed Sep. 23, 2011, Office Action.
U.S. Appl. No. 12/119,434, filed Oct. 26, 2011, Notice of Allowance.
U.S. Appl. No. 12/119,434, filed Mar. 14, 2012, Notice of Allowance.
U.S. Appl. No. 12/258,249, filed Oct. 24, 2008, Naylor.
U.S. Appl. No. 11/835,641, filed Aug. 8, 2007, Naylor.
U.S. Appl. No. 12/264,460, filed Nov. 4, 2008, Naylor.
U.S. Appl. No. 12/119,434, filed May 12, 2008, Caterina.
U.S. Appl. No. 12/264,469, filed Nov. 4, 2008, Naylor.
U.S. Appl. No. 12/264,480, filed Nov. 4, 2008, Naylor.
U.S. Appl. No. 12/264,493, filed Nov. 4, 2008, Naylor.
U.S. Appl. No. 12/260,021, filed Oct. 28, 2008, Naylor.
U.S. Appl. No. 61/013,963, filed Dec. 14, 2007, Naylor.
U.S. Appl. No. 60/654,702, filed Feb. 17, 2005, Naylor.
U.S. Appl. No. 60/656,060, filed Feb. 23, 2005, Naylor.
U.S. Appl. No. 60/688,146, filed Jun. 6, 2005, Naylor.
U.S. Appl. No. 12/212,529, filed Sep. 27, 2008, Caterina.
U.S. Appl. No. 12/258,240, filed Oct. 24, 2008, Caterina.
"Thawzall Heater" http://www.themachinecompany.com/faq.htm.
"Q Foil Performance" http://www.rotabolt.com.html/qfoil_1.html.
"Q Foil Technology" http://www.rotabolt.com.html/qfoil.htinl.
"Q Foil Product Features" http://www.rotabolt.com.html/qfoil_2.html.
"Thawzall Product Selection" http://www.themachinecompany.com/products.htm.
"Ground Heaters S3000" http://www.groundheaters.com/s3000.htm.
"How it Works" http://www.groundheaters.com/how_it_works.htm.
"FP Parallel Constant Watt Heating Cable" Thermon Manufacturing Co.
"SCS Concrete Curing Blankets" http://www.scsincorporated.com/curingblankets.htm.
"Mauritzon Concrete Curing Blankets" http://www.mauritzononline.com.concretecure.html.
"Concrete-Curing-Blankets.Com" http://concrete-curing-blankets.com.
"Janell Concrete Curing Methods" http://www.janell.com/engineering_data.html.
"GrafTech Material Safety Data Sheet" May 17, 2005.
Concrete Curing Technology, Inc. "Instructions for Use of Pad".

(56) References Cited

OTHER PUBLICATIONS

"Electrical Floor Heating", portion of catalog from Heating Catalog, http://www.wattsradiant.com.
"The Future Looks Radiant", Full Line Radiant Catalong, http://www.wattsradiant.com 2007.
"Hotmesh", various pages from website, http://www.worldscientificdevelopment.com/hotmesh/motivation.html.
"GO Polymers" http://www.gopolymers.com/index.php?module-abs.
Julian Norley and Gary Chen "GrafTech High Performance, Lightweight Graphite Heat Sinks/Spreaders" IEEE 2002.
GRAFOIL Flexible Graphite "Typical Grafoil Sheet Properties".
"Springfield Wire Inc." http://www.springfield-wire.com/category.cfm?Category=21.
Office Action dated Jan. 25, 2006 cited in related U.S. Pat. No. 7,230,213.
Office Action dated Aug. 28, 2006 cited in related U.S. Pat. No. 7,230,213.
Notice of Allowance dated Feb. 7, 2007 cited in related U.S. Pat. No. 7,230,213.
Office Action dated Jun. 22, 2006 cited in related U.S. Pat. No. 7,183,524.
Notice of Allowance dated Nov. 29, 2006 cited in related U.S. Pat. No. 7,183,524.
Office Action dated Mar. 15, 2007 cited in related U.S. Appl. No. 11/422,580.
Office Action dated Jul. 27, 2007 cited in related U.S. Appl. No. 11/422,580.
Office Action dated Dec. 10, 2008 cited in U.S. Appl. No. 11/422,580.
"Q Foil Technology" http://www.rotabolt.com.html/qfoil.html.
"Q Foil Product Features" http://www.rotabolt.com.html/qfoil_2.html.
"Hotmesh", various pages from website, http://www.worldscientificdevelopment.com/hotmesh/motivation/html.
U.S. Appl. No. 11/422,580, Nov. 16, 2009, Notice of Allowance.
U.S. Appl. No. 11/422,580, Apr. 15, 2010, Notice of Allowance.
U.S. Appl. No. 11/422,580, Nov. 22, 2010, Notice of Allowance.
U.S. Appl. No. 11/835,641, Sep. 1, 2010, Office Action.
U.S. Appl. No. 12/119,434, Sep. 29, 2010, Office Action.
U.S. Appl. No. 12/119,434, Mar. 3, 2011, Notice of Allowance.
U.S. Appl. No. 11/422,580, Aug. 17, 2010, Notice of Allowance.
U.S. Appl. No. 13/607,531, filed Sep. 7, 2012, Naylor.
U.S. Appl. No. 12/119,434, May 29, 2012, Notice of Allowance.
U.S. Appl. No. 12/212,529, May 11, 2012, Final Office Action.
U.S. Appl. No. 12/264,460, Aug. 20, 2012, Office Action.
U.S. Appl. No. 12/843,523, Mar. 1, 2013, Office Action.
U.S. Appl. No. 12/843,523, Sep. 16, 2013, Notice of Allowance.
U.S. Appl. No. 13/607,531, Oct. 10, 2013, Office Action.
U.S. Appl. No. 14/107,697, Dec. 16, 2013, Notice of Allowance.
U.S. Appl. No. 14/107,697, filed Dec. 16, 2013, Naylor.
U.S. Appl. No. 12/264,460, Jan. 31, 2014, Office Action.
U.S. Appl. No. 12/264,460, Mar. 28, 2013, Final Office Action.
U.S. Appl. No. 12/264,460, Sep. 8, 2014, Notice of Allowance.
International Search Report and Written Opinion for PCT/US2005/037414 dated Mar. 7, 2006.
International Search Report and Written Opinion for PCT/US2006/04437 dated Jul. 3, 2006.
International Search Report and Written Opinion for PCT/US2008/62481 dated Sep. 17, 2008.
Internationsl Search Report and Written Opinion for PCT/US2008/62479 dated Sep. 22, 2008.
International Search Report and Written Opinion for PCT/US2009/043443 dated Jul. 2, 2009.
GrafTech International "Dramatically Improve Your Radiant Floor Heating Performance" Copyright 2008 GrafTech International Holdings Inc. 1 page.
International Search Report and Written Opinion for PCT/US2011/039489 dated Oct. 19, 2011.
U.S. Appl. No. 14/107,697, May 13, 2014, Notice of Allowance.
U.S. Appl. No. 14/107,697, Jul. 21, 2014, Notice of Allowance.
U.S. Appl. No. 12/433,974, Aug. 7, 2014, Office Action.
U.S. Appl. No. 14/107,697, Oct. 3, 2014, Notice of Allowance.
U.S. Appl. No. 12/264,460, Dec. 26, 2014, Notice of Allowance.
U.S. Appl. No. 13/607,437, Mar. 11, 2015, Office Action.
U.S. Appl. No. 13/607,649, Mar. 12, 2015, Office Action.
U.S. Appl. No. 12/212,529, Jun. 18, 2014, Office Action.
U.S. Appl. No. 12/212,529, May 8, 2015, Final Office Action.
U.S. Appl. No. 12/212,529, Oct. 6, 2015, Office Action.
U.S. Appl. No. 13/607,437, Aug. 21, 2015, Final Office Action.
U.S. Appl. No. 12/212,529, Mar. 21, 2016, Final Office Action.

* cited by examiner

PALLET WARMER HEATING UNIT

CROSS-REFERENCE TO RELATED APPLICATIONS

This application is a continuation-in-part of co-pending U.S. patent application Ser. No. 12/258,240, filed Oct. 24, 2008, entitled HEATING UNIT FOR WARMING PALLETS, and U.S. patent application Ser. No. 12/119,434, filed May 12, 2008, entitled HEATING UNIT FOR WARMING PALLETS, each of which is a continuation-in-part of U.S. application Ser. No. 11/835,641, filed Aug. 8, 2007 now abandoned, entitled GROUNDED MODULAR HEATED COVER, which is a continuation-in-part of U.S. patent application Ser. No. 11/744,163, filed May 3, 2007 now abandoned, entitled MODULAR HEATED COVER, which is a continuation-in-part of U.S. patent application Ser. No. 11/218,156, filed Sep. 1, 2005, now U.S. Pat. No. 7,230,213, issued Jun. 12, 2007, entitled MODULAR HEATED COVER. This application is also a continuation-in-part of U.S. patent application Ser. No. 11/422,580, filed Jun. 6, 2006 now U.S. Pat. No. 7,880,121, entitled A RADIANT HEATING APPARATUS, which claims priority to and the benefit of U.S. Provisional Patent Application Ser. No. 60/688,146, filed Jun. 6, 2005, entitled LAMINATE HEATING APPARATUS. U.S. patent application Ser. No. 11/422,580 is also a continuation-in-part of U.S. patent application Ser. No. 11/218,156, filed Sep. 1, 2005, now U.S. Pat. No. 7,230,213, issued Jun. 12, 2007, entitled MODULAR HEATED COVER, which claims priority to and the benefit of: (a) U.S. Provisional Patent Application Ser. No. 60/654,702, filed Feb. 17, 2005, entitled A MODULAR ACTIVELY HEATED THERMAL COVER; (b) U.S. Provisional Patent Application Ser. No. 60/656,060, filed Feb. 23, 2005, entitled A MODULAR ACTIVELY HEATED THERMAL COVER; and (c) U.S. Provisional Patent Application Ser. No. 60/688,146, filed Jun. 6, 2005, entitled LAMINATE HEATING APPARATUS. U.S. patent application Ser. No. 11/422,580 is also a continuation-in-part of U.S. patent application Ser. No. 11,344,830, filed Feb. 1, 2006, now U.S. Pat. No. 7,183,524, issued Feb. 27, 2007, entitled MODULAR HEATED COVER, which claims priority to and the benefit of: (a) U.S. Provisional Patent Application Ser. No. 60/654,702, filed Feb. 17, 2005, entitled A MODULAR ACTIVELY HEATED THERMAL COVER; (b) U.S. Provisional Patent Application Ser. No. 60/656,060, filed Feb. 23, 2005, entitled A MODULAR ACTIVELY HEATED THERMAL COVER; and (c) U.S. Provisional Patent Application Ser. No. 60/688,146, filed Jun. 6, 2005, entitled LAMINATE HEATING APPARATUS. U.S. patent application Ser. No. 11,344,830 is also a continuation-in-part of U.S. patent application Ser. No. 11/218,156, filed Sep. 1, 2005, now U.S. Pat. No. 7,230,213, issued on Jun. 12, 2007, entitled MODULAR HEATED COVER. Each of the preceding U.S. patent applications and patents is incorporated herein in its entirety by this reference

BACKGROUND

1. Technical Field

The present invention relates to warming applications. More specifically, the invention relates to methods, systems, and devices for warming materials stored on a pallet.

2. The Relevant Technology

Changing weather can affect driving surfaces. For example, the expansion and contraction of asphalt paved surfaces, resulting from cycling temperatures due to alternating exposure to sun and snow, can lead to the creation of potholes in the asphalt driving surfaces. To fix these potholes, asphalt patch is used, which is a combination of oil, gravel, tar, and a number of other materials. To be used, the asphalt patch needs to be maintained above a given temperature to allow it to be properly applied to a pothole. However, cold weather conditions can make maintaining the asphalt patch above the given temperature a challenge. Cities and other municipalities often discard as much as 40% of asphalt patch purchased, because it cannot be maintained at an appropriate temperature.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF THE INVENTION

The present invention relates to heating applications, and particularly to portable heating units for heating materials, such as materials stored on a pallet. In one embodiment, the heating unit includes a first wall module that forms the first and second walls of the heating unit. A second wall module forms the third and fourth walls of the heating unit. The first and second wall modules can be selectively coupled to one another by one or more fasteners to at least partially define an interior space of the heating unit. The one or more fasteners can include grommets, snaps, straps, cords, rope, or a combination thereof. The interior space formed by the first and second wall modules can receive a pallet of materials that are to be warmed.

The first, second, third, and fourth walls of the heating unit each include first and second cover layers, a frame, a heating components, and an insulation layer. The cover layers can be formed of vinyl and can be attached to one another around their edges. The frame is positioned between the first and second cover layers and is configured to provide structural support to the wall. The heating component is also positioned between the first and second cover layers. The heating component includes a heat generating element for converting electrical current to heat energy and a heat spreading element thermally coupled to the heat generating element for substantially uniformly spreading the heat energy over the wall. The heat spreading element can be a carbon-based material, such as graphite, and can be thermally isotropic in one plane. The insulation layer is positioned at one side of the heating component and is configured to direct heat energy to the interior space of the heating unit. The insulation layer can be formed of a closed cell foam. The heating unit also includes a lid module that rests upon the first and second wall modules to cover and retain heat within the interior space of the heating unit. The lid module can include flaps arranged to prevent or inhibit wind from entering the interior space of the heating unit.

In some exemplary embodiments, one or more of the walls and/or portions of the lid module can be used as a door to provide access to the interior space of the heating unit. For example, the first and second walls can be pivotally coupled to one another by a hinge such that one or both of the walls can pivot relative to the other wall, thus functioning as a door. Additionally, the heating unit can include a thermostat configured to regulate an operating temperature of the heating unit. The thermostat can be incorporated in a temperature controller that includes a receptacle for receiving a receiving power connector electrically connected to one of the heating components and a plug for electrically connecting the temperature controller to a power source.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Disclosed herein are embodiments of a heating unit for use in pallet warming or other warming applications. In particular, some embodiments may include a heating unit configured to substantially cover the entire outer perimeter of a pallet and items stored on the pallet, including substantially the full height of the pallet and items stored thereon. The heating unit includes a heating element which provides heat and spreads the heat over at least portions of the surface of the heating unit. The heating unit may also include an insulation layer to prevent heat from being lost to an environment external to an enclosed area formed by the heating unit.

FIGS. 1 through 3B illustrate perspective views of an exemplary embodiment of a heating unit 100 according to the present invention. Heating unit 100 is generally configured as a pallet warmer. The term "pallet warmer," as used herein, broadly refers to a heating unit that is configured to substantially receive, surround, and/or enclose materials, whether on a pallet or not, that are to be warmed by heating unit 100. Thus, heating unit 100 may also be referred to herein as pallet warmer 100. In the illustrated embodiment, for example, heating unit 100 is generally box shaped so that it can receive therein a pallet full of materials 102 that are to be warmed by heating unit 100.

Figure 1:
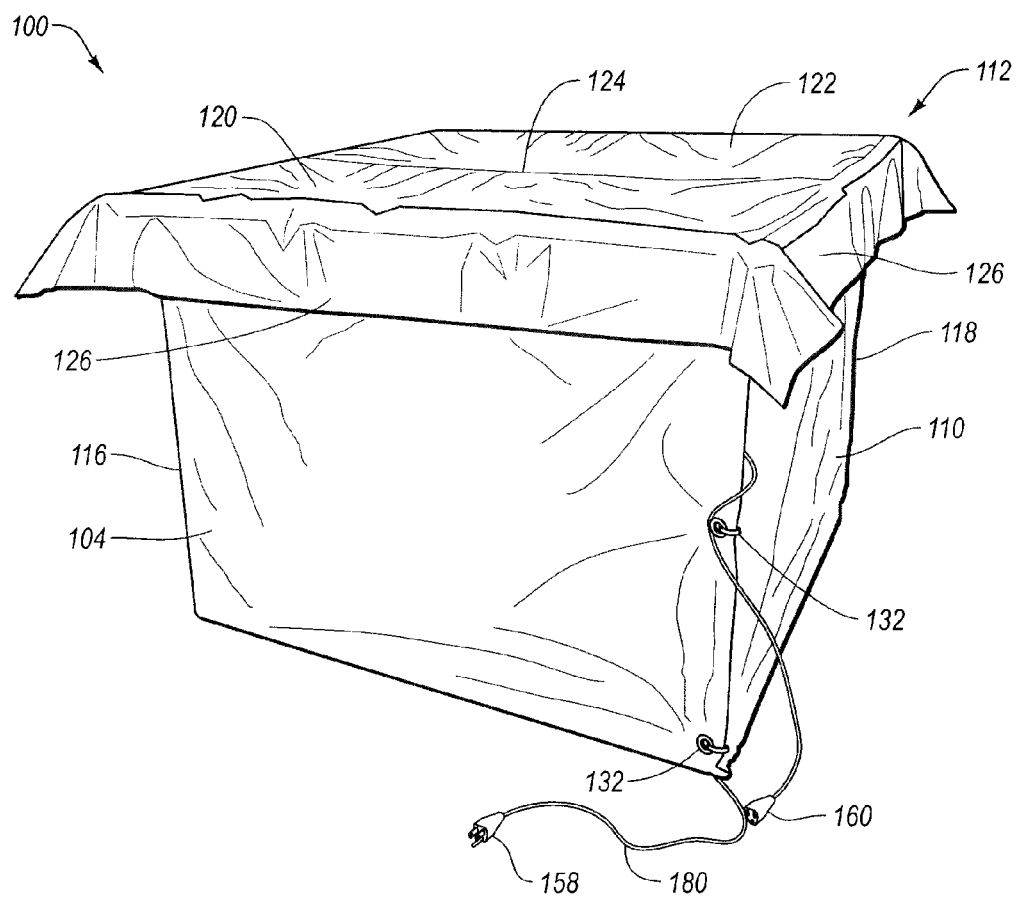
FIG. 1 illustrates a perspective view of a heating unit according to one exemplary embodiment of the present invention, the heating unit being configured as a pallet warmer.

As seen in FIGS. 1 through 3B, heating unit 100 has four upright walls 104, 106, 108, and 110 and a lid 112 that define an interior space 114 for receiving materials 102. Lid 112 is supported by walls 104, 106, 108, and 110 and covers interior space 114 and materials 102. With heating unit 100 assembled as shown in FIG. 1, materials 102 are substantially enclosed by heating unit 100 such that heating unit 100 extends around the sides and over the top of materials 102.

Heating unit 100 is configured to provide heat to interior space 114 and materials 102 that are placed therein. Furthermore, when heating unit 100 is closed as shown in FIG. 1, heating unit 100 is configured to retain within interior space 114 heat generated by heating unit 100. By retaining the generated heat within interior space 114, heating unit 100 is able to warm materials 102 to or maintain materials 102 at a desired temperature.

Figure 2:
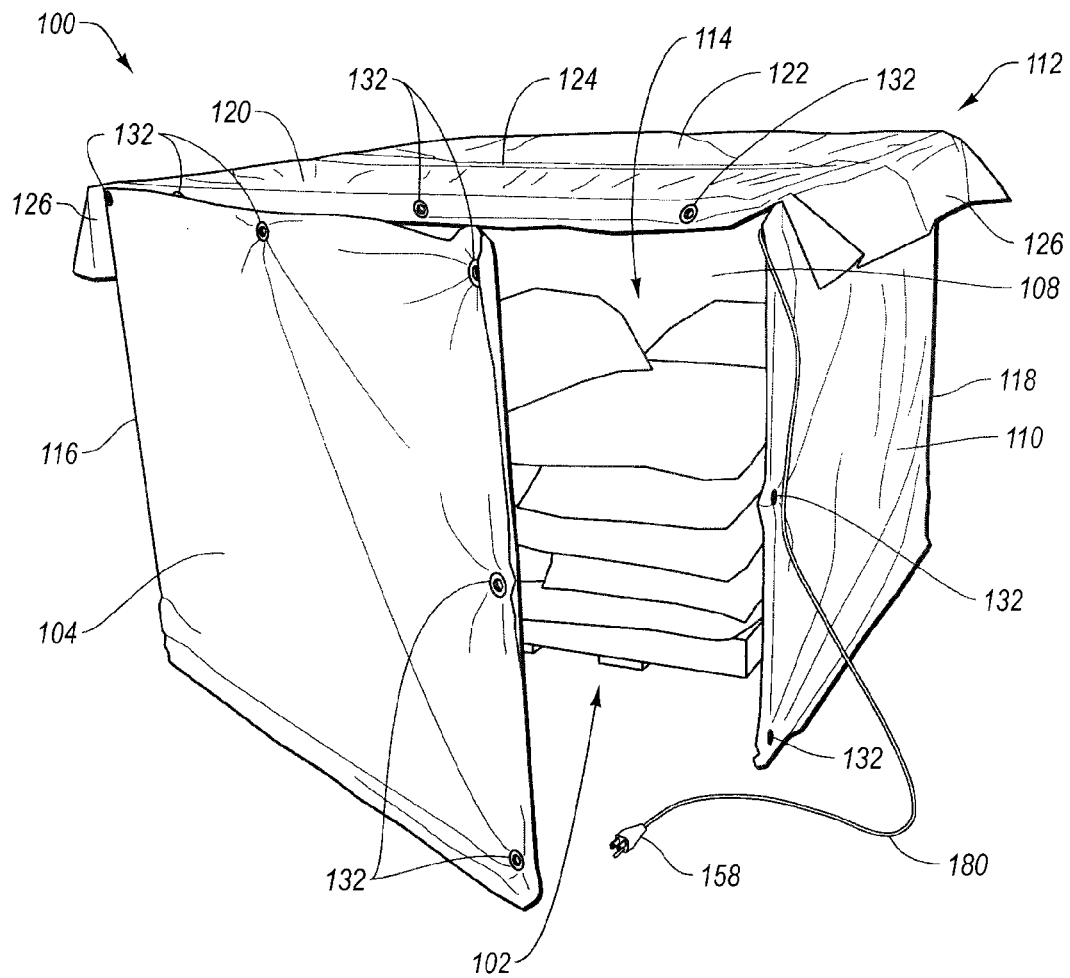
FIG. 2 is a perspective view of the pallet warmer of FIG. 1 illustrating one of the walls of the pallet warmer being used as a door to provide access to the interior of the pallet warmer.

FIG. 2 illustrates one manner of accessing interior space 114. Wall 104 functions as a door which can be selectively opened and closed to facilitate insertion or removal of materials 102 from heating unit 100. Wall 104 pivots or swings about hinge 116. Wall 104 can be partially opened, as shown in FIG. 2, to allow a relatively small amount of materials 102 to be inserted or retrieved from heating unit 100. For instance, wall 104 can be opened far enough for a bag of asphalt patch to be placed in or removed from heating unit 100. Opening wall 104 just far enough to retrieve a small amount of materials 102 desirably limits the amount of heat that is able to escape from interior space 114. Additionally, wall 104 can pivot up to 270° so that wall 104 is folded back against wall 106. Allowing wall 104 to be completely opened in this manner enables a large amount of materials 102 to be inserted or removed from heating unit 100. For example, when wall 104 is completely opened, a forklift can be used to insert a pallet full of materials 102 into heating unit 100 without wall 104 being in the way.

While wall 104 has be shown and described as functioning as a door to interior space 114, it will be appreciated that any one or more of walls 104, 106, 108, and 110 can function as a door. For example, wall 106 can pivot about hinge 116 to provide access to interior space 114. Similarly, walls 108 and 110 can each pivot about hinge 118 to provide access to interior space 114. Using each of walls 104, 106, 108, and 110 as a door allows access to interior space 114 from any side of heating unit 100.

Interior space 114 can also be accessed by way of lid 112. Lid 112 includes a first panel 120 and a second panel 122. First and second panels 120 and 122 function as doors or hatches which can be selectively opened and closed to facilitate insertion or removal of materials 102 from heating unit 100. First and second panels 120 and 122 pivot about hinge 124. Each of first and second panels 120 and 122 can be partially opened to allow a relatively small amount of materials 102 to be inserted or retrieved from heating unit 100. For instance, one of first and second panels 120 and 122 can be opened far enough for a bag of asphalt patch to be placed in or removed from heating unit 100. Opening one of first and second panels 120 and 122 just far enough to retrieve a small amount of materials 102 desirably limits the amount of heat that is able to escape from interior space 114. Additionally, first and second panels 120 and 122 can each pivot up to 180° to a fully opened position. As illustrated in FIG. 3, for example, first panel 120 can be pivoted about hinge 124 so that first panel 120 is folded back and rests upon second panel 122. Similarly, second panel 122 can also be pivoted about hinge 124 so that second panel 122 is folded back and rests upon first panel 120.

Lid 112 may include flaps 126 that extend from the peripheral edges of lid 112. Flaps 126 can be integrally formed with lid 112 or can be secured to lid 112. In one embodiment, flaps 126 extend about six inched over walls 104, 106, 108, and 110. Flaps 126 can assist in retaining heat within interior space 114. Likewise, flaps 126 can limit or prevent wind or air from entering interior space 114.

Figure 3A:
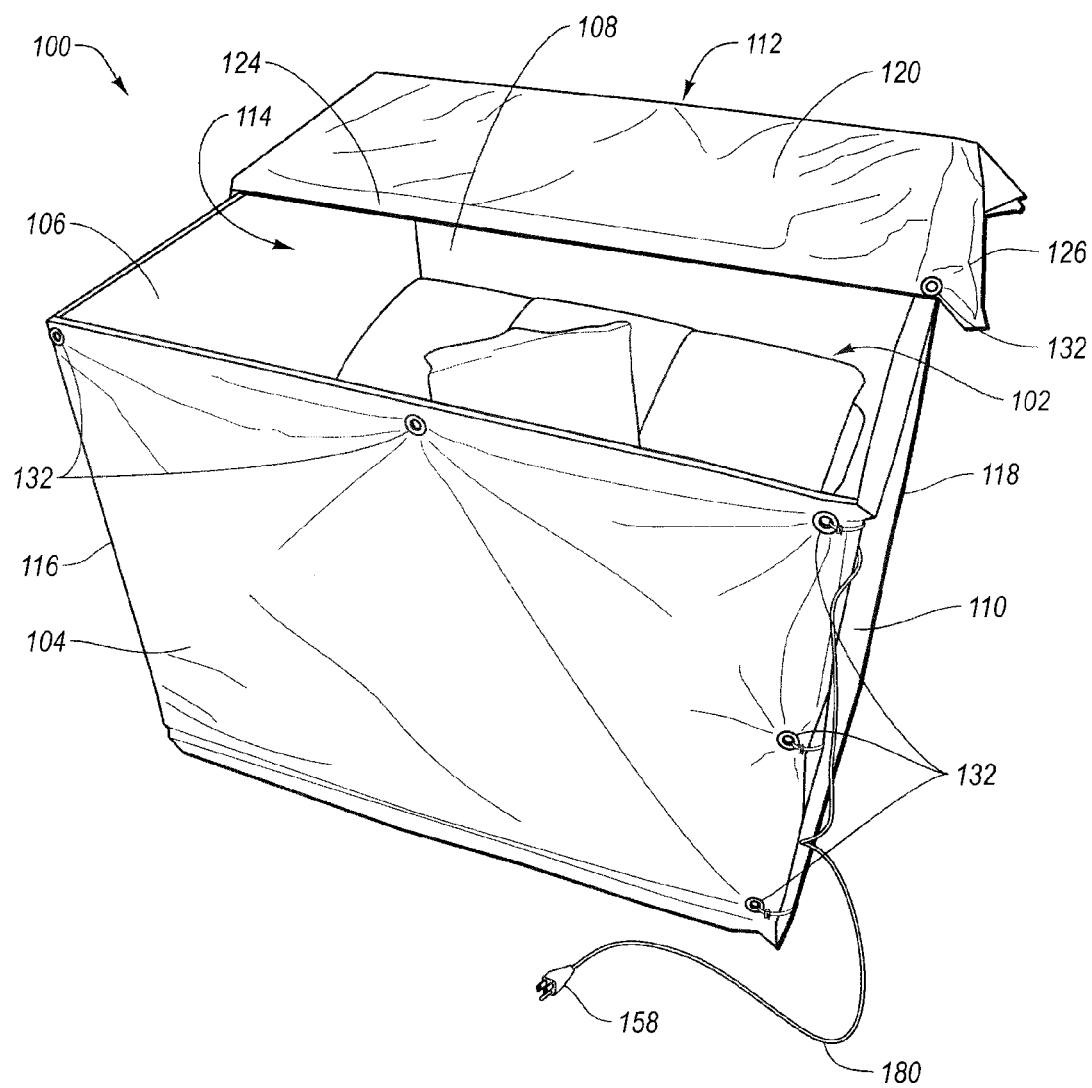
FIG. 3A is a perspective view of the pallet warmer of FIG. 1 illustrating the lid of the pallet warmer being opened to provide access to the interior of the pallet warmer.
Figure 3B:
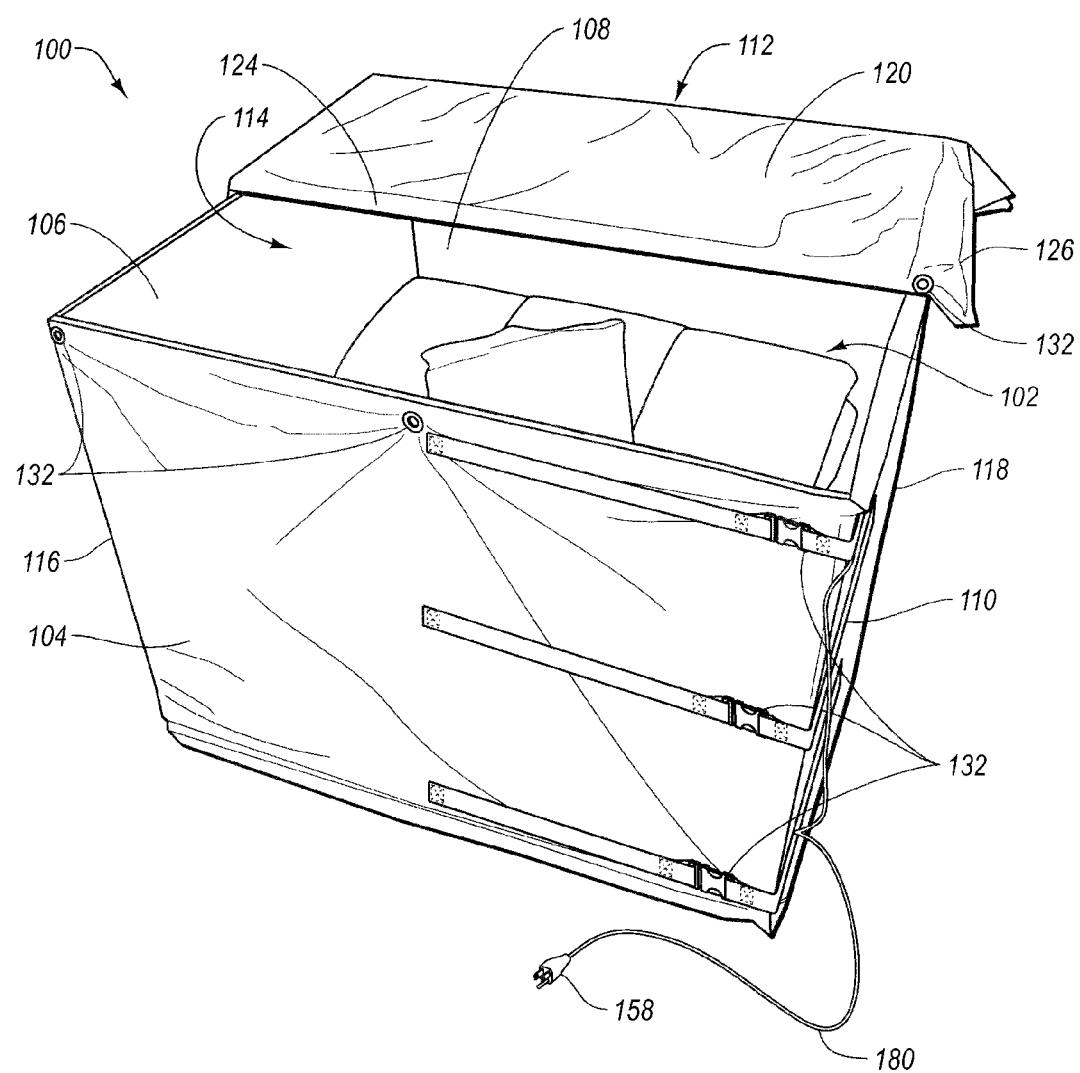
FIG. 3B is a perspective view of a pallet warmer similar to that of FIG. 3A, the pallet warmer having strap and clip fasteners for securing the walls together.
Figure 4:
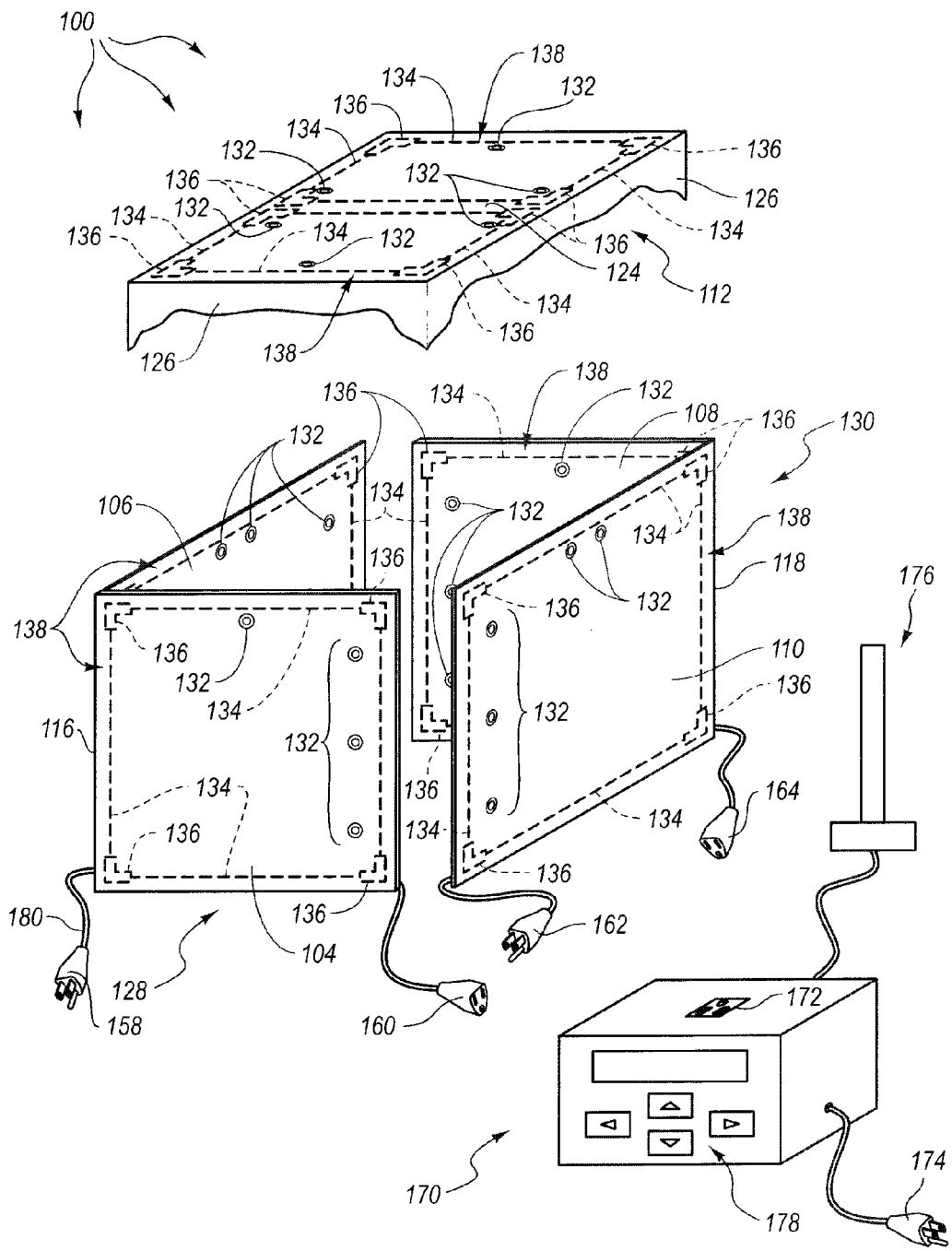
FIG. 4 is an exploded view of the pallet warmer of FIG. 1 illustrating various modules that form the pallet warmer.

With continued reference to FIGS. 1 through 3B, attention is now directed to FIG. 4, in which a partially exploded view of heating unit 100 is illustrated. As seen in FIG. 4, heating unit 100 is a modular heating unit including, in this example, three modules. The first module 128 is formed by walls 104 and 106 and hinge 116. Similarly, the second module 130 is formed by walls 108 and 110 and hinge 118. Lid 112 forms the third module, also designated by reference number 112. First module 128 and second module 130 each are designed to be supported on their edges when folded along hinges 116 and 118, respectively. First and second modules 128 and 130 are also configured to be coupled together, either securely or without securement, to substantially form the walls of heating unit 100 and at least partially define interior space 114. Hinges 116 and 118 allow modules 128 and 130 to be folded such that modules 128 and 130 can be supported on their edges in a somewhat stable fashion. In addition, interior space 114 does not necessarily need to be rectangular with squared corners emanating from the hinges 116 and 118, but rather, any suitable angles and/or curves can be used.

In the illustrated embodiment, modules 128, 130, and 112 each include fasteners 132. Fasteners 132 can be used to securely couple modules 128, 130, and 112 to each other. For instance, fasteners 132 positioned along the vertical edges of walls 104 and 110 can be used to couple walls 104 and 110 together, while fasteners 132 positioned along the vertical edges of walls 106 and 108 can be used to couple walls 106 and 108 together. Similarly, fasteners 132 positioned along the edges of lid 112 and along the top edges of walls 104, 106, 108, and 110 can be used to couple lid 112 to walls 104, 106, 108, and 110.

In some embodiments, fasteners 132 may be selectively coupleable to allow a wall, such as wall 104, to be used as a door for accessing materials being heated by heating unit 100, as described above. For instance, in the embodiment illustrated in FIGS. 1-3A, fasteners 132 include grommets that can be selectively secured using one or more adjustable bungee cords. Alternatively, as illustrated in FIG. 3B, fasteners 132 may include straps that are attached to walls 104, 106, 108, and/or 110 and which can be coupled together by way of one or more clips. For more permanent securement, fasteners 132 may be fastened by zip ties, rope, string, wire, or other appropriate fasteners.

As seen in FIG. 4 in phantom view, modules 128, 130, and 112 include support members arranged to provide rigidity to modules 128, 130, and 112. In particular, modules 128, 130, and 112 include rods 134 and elbows 136 joined together in generally rectangular shaped frames 138. In the illustrated embodiment, each of modules 128, 130, and 112 includes two such frames 138. For instance, module 128 includes a frame 138 within wall 104 and a frame 138 within wall 106. Similarly, module 130 includes a frame 138 within wall 108 and a frame 138 within wall 110. Likewise, lid 112 includes a frame 138 within first panel 120 and a frame 138 within second panel 122. Hinges 116, 118, and 124 are formed, respectively, between the frames in modules 128, 130, and 112.

As will be discussed later herein, modules 128, 130, and 112 may include pliable covers and other flexible materials that may not sufficiently support modules 128, 130, and 112 when modules 128, 130, and 112 are supported by their edges and assembled as shown in FIGS. 1 through 4. Thus, frames 138 can act as stiffeners to allow modules 128, 130, and 112 to be better supported when supported by their edges. In one embodiment, the pliable covers may form an envelope that can be used to house frames 138 as well as other components such as insulation and heating components as described in more detail below.

The rods 134 and elbows 136 may be constructed from materials such as fiberglass, plastic, metal (such as copper, aluminum, steel, etc), or other materials. In one particular embodiment, fiberglass rods 136 are used with copper elbows 136. The rods 134 can be inserted into hollow elbows 136 to form frames 138. The rods 134 may be secured into the elbows 136 using an appropriate glue or epoxy material. In the example illustrated, the rods 134 are secured into the elbows 136 using Loctite 380, also known as Black Max, available from Henkel Corporation of Düsseldorf, Germany.

Hinges 116, 118, and 124 may be formed in a number of different ways. For example, two walls or panels can be connected together to form the hinge therebetween. For instance, walls 104 and 106 can be joined together to form hinge 116. Alternatively, a module can be formed and then an operation can be performed on the module to form the hinge. For example, lid 112 could be formed with two frames 138, internal components, and cover layers. Once lid 112 is so formed, an operation could be performed on lid 112 to create hinge 124. Such operations may include various heat welding operations or other appropriate operations. In some embodiments, for example, modules 128, 130, and 112 may have external vinyl coverings which may allow for heat welding and heat seams to be formed in the vinyl. The heat welding and heat seams formed in the vinyl between frames 138 can form hinges 116, 118, and 124. Alternatively, hinges 116, 118, and 124 can be formed of any mechanical hinge, such as those hinges well known in the art.

Figure 5:
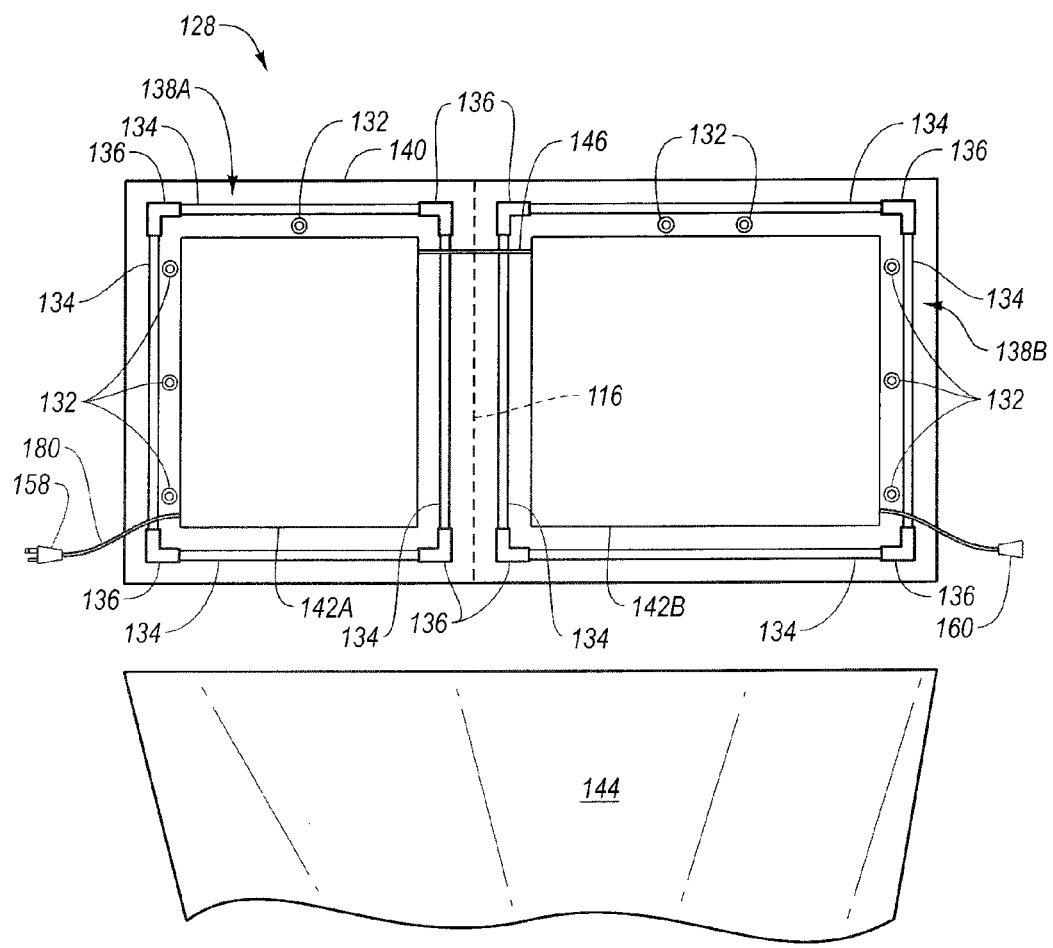
FIG. 5 is an exploded plan view of one of the wall modules of FIG. 4.

Attention is now directed to FIG. 5, which illustrates a partially exploded view of module 128. Module 128 includes a first cover layer 140, two frames 138A, 138B, heating components 142A, 142B, and a second cover layer 144. In the illustrated embodiment, first cover layer 140 is generally rectangular in shape and has frames 138A, 138B laid next to each other on top of first cover layer 140, as shown in FIG. 5. The illustrated embodiment of module 128 also includes two heating components 142A, 142B. Heating component 142A is positioned within frame 138A and heating component 142B is positioned within frame 138B. Heating components 142A, 142B are connected to each other by way of wires 146. With frames 138A, 138B and heating components 142A, 142B so positioned on first cover layer 140, second cover layer 144 is placed over frames 138A, 138B and heating components 142A, 142B. Some finished embodiments may be manufactured such that frames 138A, 138B and heating components 142A, 142B may be sealed between first cover layer 140 and second cover layer 144. Example sealing processes, such as heat welding, are disclosed elsewhere herein. In any case, the edges of first and second cover layers 140, 144 can be coupled, attached, or otherwise secured together to hold frames 138A, 138B and heating components 142A, 142B therebetween. Furthermore, the area of first and second cover layers 140, 144 between frames 138A, 138B can be joined together as described herein to form hinge 116. For instance, first and second cover layers 140, 144 can be heat welded together between frames 138A, 138B. This heat welded portion of first and second cover layers 140, 144 can function as hinge 116.

While module 128 has been shown and described as having two heating components 142A, 142B that are connected by wires 146, it will be appreciated that module 128 can also be formed with a single heating component 142. The single heating component 142 can be positioned within one of frames 138A, 138B so that when module 128 is fully assembled, heating component 142 is positioned within one of walls 104 and 106. Alternatively, a single heating component 142 can be used which extends substantially the entire length of module 128. In such an embodiment, the single heating component would be positioned at least partially within both of walls 104 and 106 when module 128 is fully assembled. Furthermore, a single heating component 142 can be formed of flexible materials to enable heating module 128 to bend around hinge 116 when walls 104 and 106 are folded to form heating unit 100.

In some embodiments, first and second cover layers 140 and 144 may comprise a textile fabric. The textile fabric may include natural or synthetic products. For example, first and second cover layers 140 and 144 may comprise burlap, canvas, cotton or other materials. In another example, first and second cover layers 140 and 144 may comprise nylon, vinyl, or other synthetic textile material. First and second cover layers 140 and 144 may comprise a thin sheet of plastic, metal foil, polystyrene, or other materials.

Module 130 can be formed with similar components and in a similar manner as module 128, described above. In particular, module 130 can have frames and heating components enclosed between first and second cover layers, as described above.

Figure 6:
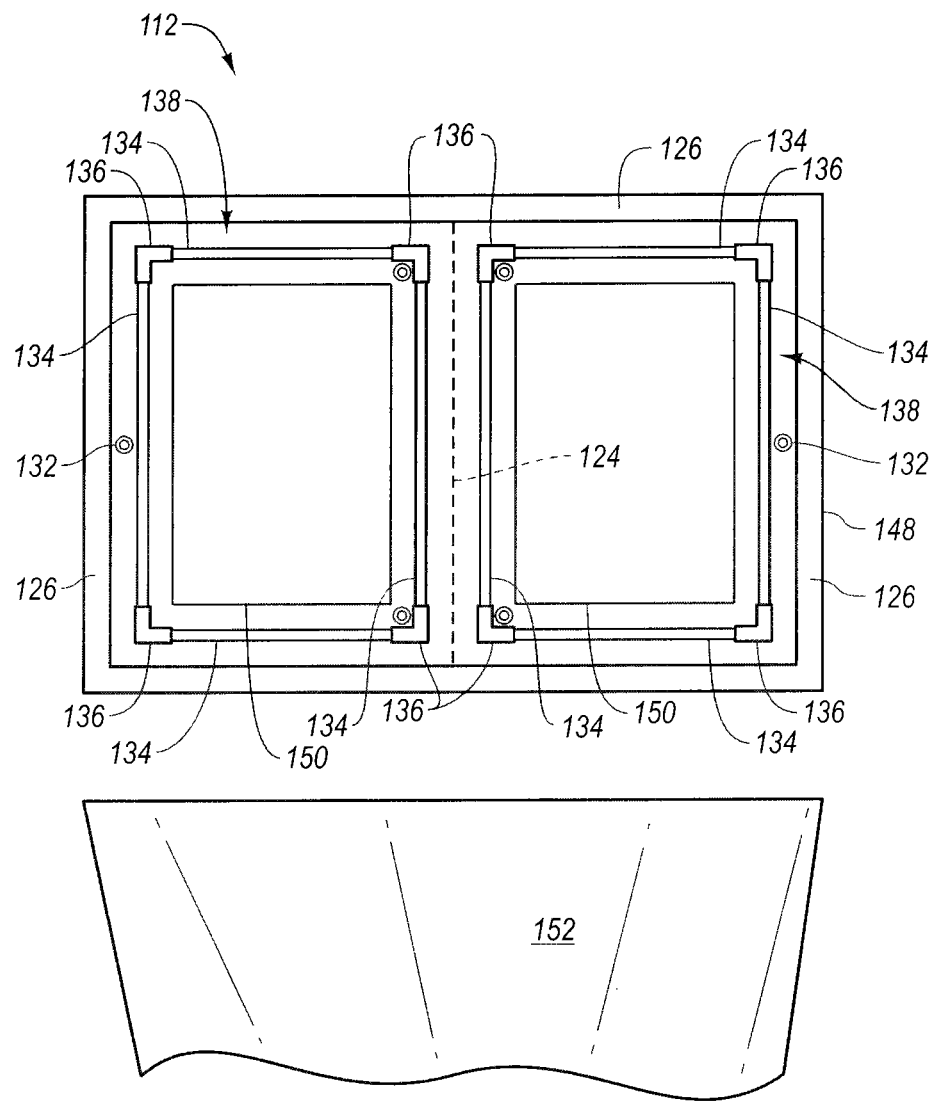
FIG. 6 is an exploded plan view of the lid module of FIG. 4.

Module or lid 112 can also be formed in a similar manner and with similar components as modules 128 and 130. For example, FIG. 6 illustrates a partially exploded view of module 112. Module 112 includes a first cover layer 148, two frames 138, internal components 150, and a second cover layer 152. As with first cover layer 140, first cover layer 148 is generally rectangular in shape and has two frames 138 laid next to each other on top of first cover layer 148, as shown in FIG. 6. The illustrated embodiment of module 112 also includes two internal components 150. One of the internal components 150 is positioned within each of frames 138. With frames 138 and internal components 150 so positioned on first cover layer 148, second cover layer 152 is placed over frames 138 and internal components 150. The edges of first and second cover layers 148, 152 are then coupled, attached, or otherwise secured together to hold frames 138 and internal components 150 therebetween. Additionally, the edges of first and second cover layers 148, 152 can cooperate to form flaps 126 described above. For example, the edges of first and second cover layers 148, 152 can be sized so that when the edges are joined together, such as through heat welding, the edges form flaps 126. Alternatively, additional material can be attached to first cover layer 148 and/or second cover layer 152 to form flaps 126. Furthermore, the area of first and second cover layers 148, 152 between frames 138 can be joined together as described herein to form hinge 124.

Figure 7:
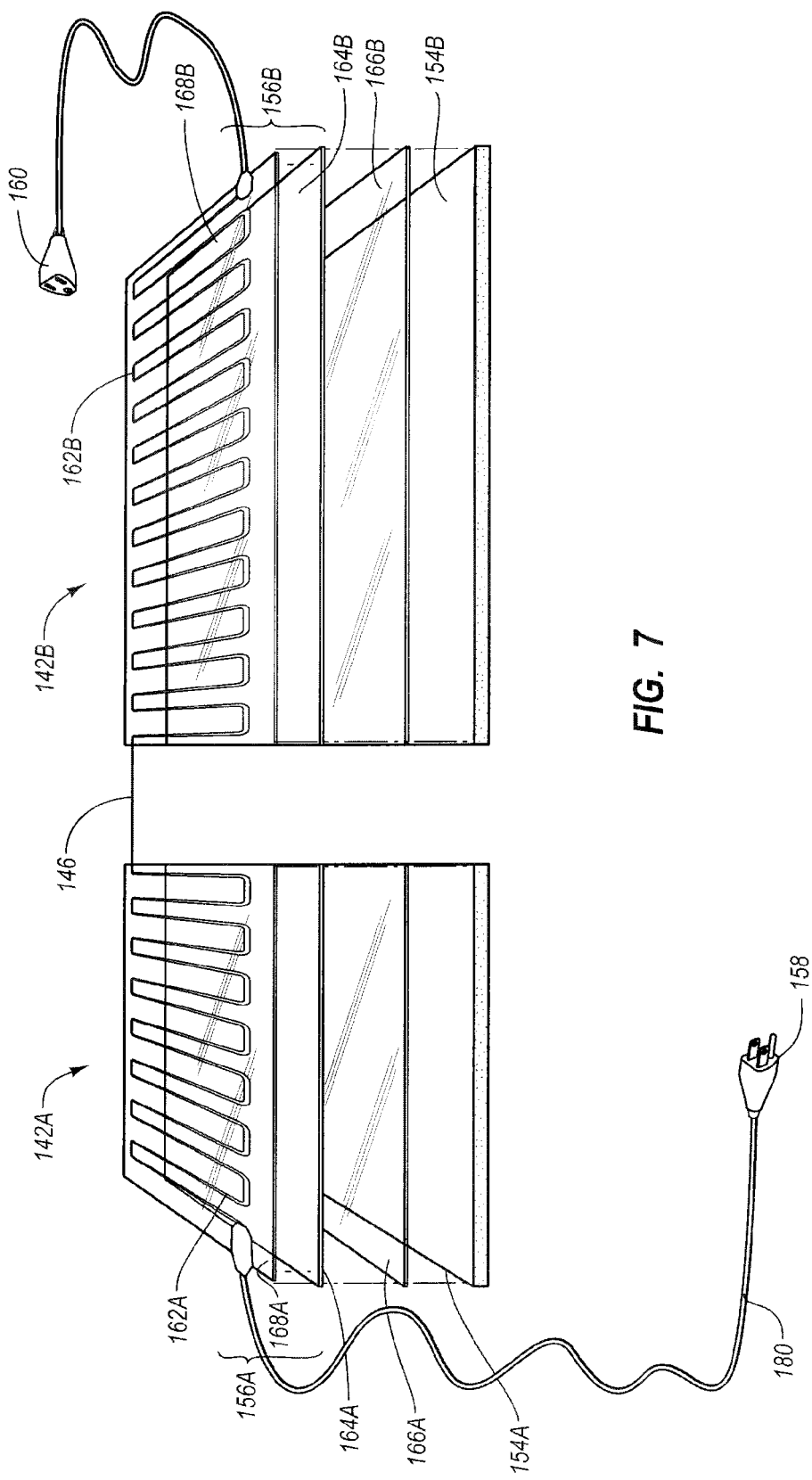
FIG. 7 is an exploded view of a heating component for use in the wall modules of FIG. 4.

Attention is now directed to FIG. 7, which illustrates an exploded view of heating component 142 used in module 128. Heating component 142 includes heating component 142A and heating component 142B, which are electrically connected by wires 146. While the following description is directed to heating component 142 used in module 128, it will be appreciated that heating component 142 can also be used in module 130 or in lid 112. It will also be appreciated that basic modifications, such as size, location of electrical connections, and the like, can be made to heating component 142 as described herein when heating component 142 is used in module 130 or lid 112.

FIG. 7 illustrates construction details of the heating component 142, including materials used to assemble heating component 142. FIG. 7 illustrates an exploded view illustrating heating components 142A and 142B. Heating component 142B includes an insulation layer 154A, a heating element 156A, and an incoming electrical connector 158. Similarly, heating component 142B includes an insulation layer 154B, a heating element 156B, and an outgoing electrical connector 160. Heating element 156A is formed of heat generating strip 162A and heat spreading element 164A, and heating element 156B is formed of heat generating strip 162B and heat spreading element 164B. Heat generating strips 162A and 162B are electrically coupled to one another by way of wires 146. As seen in FIG. 5, wires 146 extend across hinge 116. Thus, wires 146 should be durable and flexible so that wires 146 can repeatedly bend when module 128 is folded about hinge 116.

FIG. 4 illustrates that the module 130 includes a receptacle 162 that may be plugged into the receptacle 160 to obtain power when the module 130 includes active heating elements. Notably, as illustrated in FIG. 4, module 130 may include a receptacle 164 that may be used to distribute power to other modules and/or other heating units. Some embodiments of heating component 142 may include the use of glues, epoxies, or other materials to seal various layers of heating components 142A and 142B to each other and/or to first or second cover layer 140, 144. For example, in one embodiment, 30-NF FASTBOND™ contact adhesive, available from 3M located in St. Paul, Minn., may be used to glue various layers together.

As described herein, the various components of heating component 142 may be flexible. To ensure that heating component 142 and its various components retain their shape and their positions relative to one another, the various components of heating component 142 can be attached to one another. For example, the various components of heating component 142 can be glued, bonded, or otherwise held together. Attaching the components of heating component 142 together helps to prevent the components from moving relative to one another within module 128.

For example, attaching heating element 156A to insulation layer 154A and heating element 156B to insulation layer 154B ensures that heating elements 156A, 156B will stay positioned next to insulation layers 154A, 154B, respectively, and will not sag, bunch, or otherwise move within module 128. In particular, because insulation layers 154A, 154B are formed of a stiffer material than heating elements 156A, 156B, attaching heating elements 156A, 156B to insulation layers 154A, 154B provides stiffness to heating elements 156A, 156B. While insulation layers 154A, 154B are referred to as being formed of "stiffer" material, it will be appreciated that in some embodiments insulation layers 154A, 154B may still be somewhat flexible. Similarly, heat generating strip 162A and heat spreading element 164A can be attached to one another to ensure that heat generating strip 162A is properly positioned on heat spreading element 164A, even after heating unit 100 is rolled, folded, and used several times. Heat generating strip 162B and heat spreading element 164B can be similarly attached to one another to ensure that heat generating strip 162B is properly positioned on heat spreading element 164B, even after heating unit 100 is rolled, folded, and used several times. Likewise, heating elements 156A, 156B and/or insulation layers 154A, 154B can be attached to first and/or second cover layers 140, 144 to prevent heating components 142A, 142B from moving within first and second cover layers 140 and 144.

FIG. 7 illustrates one exemplary embodiment in which various components of heating components 142A, 142B are attached together. In the embodiment illustrated in FIG. 7, heating components 142A, 142B each include two interfaces between the elements of heating components 142A, 142B for attachment between the elements. Any, all, or none of the interfaces implement more secure attachment in various alternative embodiments. As used herein, an attachment interface is a surface where two or more elements of heating components 142A, 142B can be attached together. The first attachment interface 166A, 166B for each of heating components 142A, 142B is between the top surface of insulation layers 154A, 154B and the bottom surface of heat spreading elements 164A, 164B. The second attachment interface 168A, 168B is between the top surface of heat spreading elements 164A, 164B and the bottom surface of heat generating strips 162A, 162B.

In some embodiments there are additional attachment interfaces. For example, in some embodiments there are attachment interfaces between the bottom surfaces of insulation layers 154A, 154B and first cover layer 140. Similarly, there can also be attachment interfaces between the top surfaces of heat spreading elements 164A, 164B and heat generating strips 162A, 162B and the bottom surface of second cover layer 144. These additional attachment interfaces secure heating components 142A, 142B within module 128.

Attachment interfaces 166A, 166B and 168A, 168B, and any additional attachment interfaces, can be created by attaching the above identified elements of heating components 142A, 142B in any suitable manner so that the elements maintain their relative positions one to another. In one exemplary embodiment, attachment interfaces 166A, 166B and 168A, 168B are created using an adhesive between the elements of heating components 142A, 142B. One such adhesive suitable for attaching together the elements of heating components 142A, 142B is 30-NF FASTBOND™ available from 3M located in St. Paul, Minn. FASTBOND™ is a non-flammable, heat resistant, polychloroprene base adhesive.

To properly adhere the elements of heating components 142A, 142B together with FASTBOND™, the interfacing surfaces should be clean and dry. With the surfaces prepared, a uniform coat of FASTBOND™ is applied to both interfacing surfaces. After applying, the FASTBOND™ is allowed to dry completely, which typically takes about 30 minutes. Once the FASTBOND™ on both surfaces is dry, the two FASTBOND™ coated surfaces are joined together.

For example, when attaching insulation layer 154A to heat spreading element 164A, a coat of FASTBOND™ is applied to the top surface of insulation layer 154A and the bottom surface of heat spreading element 164A. Once the FASTBOND™ on each surface is dry, heat spreading element 164A is positioned on top of insulation layer 154A and the two layers of FASTBOND™ adhere to one another. The same process can be followed to attach heat spreading element 164B to insulation layer 154B and heat generating elements 162A, 162B to the top surface of heat spreading elements 164A, 164B.

In some embodiments, second cover layer 144 is attached to heating elements 156A, 156B and heating elements 156A, 156B are attached to insulation layers 154A, 154B. If desired, insulation layers 154A, 154B may not be attached to first cover layer 140. Not attaching insulation layers 154A, 154B to first cover layer 140 provides for flexibility and give in module 128 when module 128 is folded, rolled, or wrapped around an object. Specifically, module 128 may be configured to be wrapped around an object such that second cover layer 144 is adjacent the object and first cover layer 140 is positioned away from the object. When first cover layer 140 is not attached to insulation layers 154A, 154B, first cover layer 140 is able to move relative to insulation layers 154A, 154B and stretch as module 128 is wrapped around an object. In other embodiment, however, insulation layers 154A, 154B and first cover layer 140 are attached to one another. For example, when module 140 is used where less flexibility is needed, the need for first cover layer 140 to be able to move relative to insulation layers 154A, 154B is not as great.

The following discussion will now treat additional details and embodiments of the various components of the module 128 of the heating unit 100. As noted above, in some embodiments the heating elements 156A, 156B include heat generating strips or elements 162A, 162B. The heat generating elements 162A, 162B may be, for example, electro-thermal coupling material or resistive elements. In some embodiments, the heat generating strips 162A, 162B may be a copper, copper alloy, or other conductor. In one embodiment, and in particular embodiments where only module 128 is actively heated by heaters internal to the module 128, the conductor is a network of copper alloy elements configured to consume about 10 W of power per linear foot of the heat generating strips 162A, 162B and to use about 58 feet of heat generating strip so as to draw a total of about 580 Watts, most of which is generated as heat. This may be achieved by selection of appropriate alloys for the heat generating elements 162A, 162B in combination with selection of appropriate heat generating element wire sizes and circuit configurations. The conductor may convert electrical energy to heat energy, and transfer the heat energy to the surrounding environment. Alternatively, the heat generating elements 162A, 162B may comprise another conductor, such as semiconductors, ceramic conductors, other composite conductors, etc., capable of converting electrical energy to heat energy. The heat generating elements 162A, 162B may include one or more layers for electrical insulation, temperature regulation, and ruggedization.

In an alternative embodiment where both module 128 and module 130 are actively heated by heaters internal to the modules, each of the modules may include 40 feet of heat generating strip so as to generate about 400 Watts of heat for each module for a total of 800 Watts for the entire heating unit 100. In particular, some embodiments sized 4 feet×4 feet×3 feet high may be designed to generate between about 550 and 800 Watts of heat. Other units sized 4 feet×4 feet×4 feet high may be designed to generate between about 600 and 1,000 Watts of heat.

Referring again to FIG. 7, each of the heat generating elements 162A, 162B is illustrated with two heat generating conductors. One of the two conductors of heat generating element 162A is connected to a first terminal of the incoming electrical connector 158 while the other conductor is connected to a second terminal of the electrical connector 158. The first and second terminals may be connected to electrical sources as appropriate, such as generator supplied AC or DC sources, batteries, power inverters, etc. The two conductors of heat generating element 162A can be connected to the two conductors of heat generating element 162B through wires 146. Alternatively, heat generating elements 162A and 162B can comprise a single heat generating element that extends between heating components 142A and 142B. The two conductors of heat generating element 162B are connected to first and second terminals of outgoing electrical connector 160. The two conductors of heat generating element 162B may also be connected at one end to create a closed circuit allowing current to flow through the two conductors to generate heat.

The two conductors of one or both of heat generating elements 162A, 162B may be connected through a thermostat. In one embodiment, the thermostat includes a bi-metal strip based temperature control that disconnects the two conductors about a pre-determined temperature. Examples of predetermined temperatures may be between 70° F. to 100° F., and preferably operating at around 80° F. Notably, these are only examples, and other temperatures may be alternatively used. This can be used to regulate the temperature of the modules 128 and 130 to prevent overheating, or to maintain the temperature at a temperature of about the pre-determined temperature. Embodiments may be implemented where the temperature is determined by selecting a thermostat with a fixed temperature rating. Other embodiment may be implemented where the temperature setting of the thermostat can be adjusted to a predetermined temperature at manufacturing time. In some embodiments, the thermostat may be user accessible to allow a user to adjust the thermostat settings. While in the example illustrated the thermostat is located at the ends of the conductors of the heat generating element, it should be appreciated that in other embodiments the thermostat may be placed inline with one of the conductors. Additionally, some embodiments may include low voltage control circuitry including temperature control functionality, which controls application of power to the conductors to regulate temperature.

It should further be appreciated that embodiments may be implemented where other temperature or current protections are included. For example, embodiments may include magnetic and/or thermal circuit breakers, fuses, semiconductor based over-current protection, ground fault protection, arc fault protection, etc. In some embodiments, these may be located at the ends of the conductors or inline with one or more of the conductors as appropriate.

Temperature controls may be implemented using an additional temperature control. For example, FIG. 4 illustrates a temperature controller 170. The temperature controller 170 includes a receptacle 172 into which the plug 158 can be plugged. The temperature controller may include a plug 174 for receiving power, such as from an electrical outlet or other power source. The temperature controller 170 further includes a probe 176. The probe 176 may be placed inside of heating unit 100 or directly into material stored in heating unit 100. The probe 176 is connected to temperature sensing circuitry included as part of the temperature controller 170. In the example illustrated, the temperature controller includes a user interface 178 which allows a user to select one or more temperatures. In one embodiment, the temperature controller 170 includes a digital readout that allows a user to visually interact with the temperature controller 170. The digital readout may be user selectable to display temperatures in ° C., ° F., or ° K.

The temperature controller 170 may include comparison circuitry configured to compare user selected temperatures with sensed temperatures and to control power delivered to the plug 158 appropriately. For example, in one embodiment, the comparison circuitry may be coupled to a silicon control relay (SCR) or other switching device (such as a mechanical relay, transistor, etc.) that allows current to flow from a power source connected to the temperature controller plug 174 to the receptacle 172 and hence the plug 158 when a sensed temperature is within a predetermined range about a given temperature. When the temperature sensed by the sensing circuitry using the probe 176 exceeds range about the given temperature, the SCR or other switching device is opened so as to prevent current flow to the receptacle 172. For example, in one embodiment, a range may be selected that is 5° F. above and below a user selected given temperature. When a sensed temperature is 5° F. or more below the user selected given temperature, current is allowed to flow to the receptacle 172. When a sensed temperature is 5° F. or more above the user selected given temperature, current is not allow to flow to the receptacle 172. In one embodiment, the temperature controller 170 may be configured to function between 80° F. and 200° F. In particular, the temperature controller 170 may allow a user to select temperatures in this range. This range is particularly useful in embodiments used to heat asphalt patch. In another embodiment, the temperature controller may be configured to function between 50° F. and 32° F. This embodiment may be particularly useful for warm soak applications to prevent freezing of material stored in heating unit 100.

Controlling temperature may be accomplished by controlling the density of the heat generating elements 162A, 162B. This may be accomplished by controlling spacing between different portions of the heat generating elements 162A, 162B allowing for more or less material used for the heat generating elements 162A, 162B to be included in module 128 of heating unit 100. This method may be especially useful when heat generating elements have a constant Wattage output per length of heat generating element. Thus a longer heat generating element 162A, 162B provides more heat than a shorter heat generating element 162A, 162B.

The electrical heating elements 156A, 156B may further include heat spreading elements 164A, 164B. In general terms, each of heat spreading elements 164A, 164B is a layer of material capable of drawing heat from the heat generating elements 162A, 162B and distributing the heat energy away from the heat generating elements 162A, 162B. Specifically, the heat spreading elements 164A, 164B may comprise a metallic foil, wire mesh, carbon mesh, graphite, a composite material, or other material.

The heat-spreading elements 164A, 164B in one embodiment are electrically-conductive material comprising carbon. Graphite is one example of an electrically-conductive material comprising carbon. However, other suitable materials may include carbon-based powders, carbon fiber structures, or carbon composites. Those of skill in the art will recognize that material comprising carbon may further comprise other elements, whether they represent impurities or additives to provide the material with particular additional features. Materials comprising carbon may be suitable so long as they have sufficient thermal conductivity to act as a heat-spreading element. In one embodiment, the material comprising carbon comprises sufficient electrical conductivity to act as a ground connection, as will be discussed in more detail below. The heat-spreading elements 164A, 164B may further comprise a carbon derivative, or a carbon allotrope.

One example of a material suitable for a heat spreading elements 164A, 164B is a graphite-epoxy composite. The in-plane thermal conductivity of a graphite-epoxy composite material is approximately 370 watts per meter per Kelvin, while the out of plane thermal conductivity of the same material is 6.5 watts per meter per Kelvin. The thermal anisotropy of the graphite/epoxy composite material is then 57, meaning that heat is conducted 57 times more readily in the plane of the material than through the thickness of the material. This thermal anisotropy allows the heat to be readily spread out from the surface which in turn allows for more heat to be drawn out of the heating generating elements 162A, 162B.

The heat spreading elements 164A, 164B may comprise a material that is thermally isotropic in one plane. The thermally isotropic material may distribute the heat energy more evenly and more efficiently. One such material suitable for forming heat spreading elements 164A, 164B is GRAFOIL® available from Graftech Inc. located in Lakewood, Ohio. In particular, GRAFOIL® is a flexible graphite sheet material made by taking particulate graphite flake and processing it through an intercalculation process using mineral acids. The flake is heated to volatilize the acids and expand the flake to many times its original size. The result is a sheet material that typically exceeds 98% carbon by weight. The sheets are flexible, lightweight, compressible resilient, chemically inert, fire safe, and stable under load and temperature. The sheet material typically includes one or more laminate sheets that provide structural integrity for the graphite sheet.

Due to its crystalline structure, GRAFOIL® is significantly more thermally conductive in the plane of the sheet than through the plane of the sheet. This superior thermal conductivity in the plane of the sheet allows temperatures to quickly reach equilibrium across the breadth of the sheet.

Typically, the GRAFOIL® will have no binder, resulting in a very low density, making the heated cover relatively light while maintaining the desired thermal conductivity properties.

Another product produced by GrafTech Inc. that is suitable for use as a heat spreading element 164A, 164B is EGRAF® SPREADERSHIELD™. The thermal conductivity of the SPREADERSHIELD™ products ranges from 260 to 500 watts per meter per Kelvin within the plane of the material, and that the out of plane (through thickness) thermal conductivity ranges from 6.2 down to 2.7 watts per meter per Kelvin. The thermal anisotropy of the material ranges from 42 to 163. Consequently, a thermally anisotropic planar heat spreading element 164A, 164B serves as a conduit for the heat within the plane of heat spreading element 164A, 164B, and quickly distributes the heat more evenly over a greater surface area than a foil. The efficient planar heat spreading ability of the planar heat spreading element 164A, 164B also provides for a higher electrical efficiency, which facilitates the use of conventional power supply voltages such as 120 volts on circuits protected by 20 Amp breakers, instead of less accessible higher voltage power supplies. In some embodiments, the heat spreading element 164 is a planar thermal conductor. In certain embodiments, the graphite may be between 1 thousandths of an inch thick and 40 thousandths of an inch thick. This range may be used because within this thickness range the graphite remains pliable and durable enough to withstand repeated rolling and unrolling or folding and unfolding as module 128 of heating unit 100 is unrolled or unfolded for use and rolled or folded up for storage.

The heat spreading elements 164A, 164B may comprise a flexible thermal conductor. In certain embodiments, heat spreading elements 164A, 164B are formed in strips along the length of heat generating elements 162A, 162B, respectively. In alternative embodiments, heat spreading elements 164A, 164B may comprise contiguous layers.

In some embodiments, heat spreading elements 164A, 164B may also include functionality for conducting electrical energy and converting electric energy to thermal energy in a substantially consistent manner throughout the heat spreading elements. Graphite heat spreading elements may be particularly well suited for these embodiments. In such an embodiment, heat generating elements 162A, 162B may be omitted from module 128 of heating unit 100 as heat spreading elements 164A, 164B serve the purposes of conveying current, producing heat due to resistance, and evenly distributing the heat.

The small size and thickness of the graphite minimizes the weight of heat spreading elements 164A, 164B. The graphite containing heat spreading element may be pliable such that the graphite can be rolled lengthwise without breaking the electrical path through the graphite.

In some embodiments, heat spreading elements 164A, 164B may include an insulating element formed of a thin plastic layer on both sides of heat-spreading elements 164A, 164B. The insulating element may additionally provide structure to the heat-spreading material used in heat spreading elements 164A, 164B. For example, the insulating element may be polyethylene terephthalate (PET) in the form of a thin plastic layer applied to both sides of heat-spreading elements 164A, 164B comprising graphite. Those of skill in the art will appreciate that such a configuration may result in the insulating element lending additional durability to heat spreading elements 164A, 164B in addition to providing electrical insulation, such as electrical insulation from the electrical current in heat generating elements 162A, 162B. It should be noted that heating generating elements 162A, 162B may include their own electrical insulation as well as described above.

In certain embodiments, heat generating elements 162A, 162B are in direct contact with heat spreading elements 164A, 164B, respectively, to ensure efficient thermo-coupling. Alternatively, heat spreading elements 164A, 164B and heat generating elements 162A, 162B, respectively, are integrally formed. For example, heat spreading element 164A may be formed or molded around heat generating element 162A. Alternatively, heat generating element 162A and heat spreading element 164A may be adhesively coupled as described herein.

Notably, while temperature may be controlled with the use of thermostats as described above, other embodiments may implement other design criteria to control temperature. For example, some embodiments may use appropriate selection of heat spreading elements 164A, 164B and/or the arrangement of heat generating elements 162A, 162B. Illustratively, the heat retention properties of heat spreading elements 164A, 164B may be a factor in regulating temperatures at which module 128 of heating unit 100 will operate. Further, the density of heat generating elements 162A, 162B with respect to the size of module 128 of heating unit 100 or heat spreading elements 164A, 164B can be used to set the operating temperatures or to regulate temperatures.

FIG. 7 illustrates optional insulating layers 154A, 154B. The insulating layers 154A, 154B may be used to reflect or direct heat or to prevent heat from exiting in an undesired direction. For example, it may be desirable to have all or most of the generated heat be directed towards a particular surface of heating module 128 of heating unit 100. In particular, it is desirable to direct heat towards palleted material 102 in heating unit 100 while directing heat away from an exterior environment in which the pallet and heating unit 100 is located. In the example illustrated, it may be desirable to have heat directed towards the side of module 128 which includes the second cover layer 144, while directing heat away from the side that includes the first cover layer 140. The insulating layers 154A, 154B may be used to accomplish this task.

The insulating layers 154A, 154B may include a sheet of polystyrene, cotton batting, Gore-Tex®, fiberglass, foam rubber, etc. In one particular embodiment, the insulating layers 154A, 154B include a layer of closed cell foam. In certain embodiments, insulating layers 154A, 154B may allow a portion of the heat generated by heat generating elements 162A, 162B to escape the outside of the second cover layer 144 if desired. For example, insulating layers 154A, 154B may include a plurality of vents to transfer heat to the second cover layer 144. In certain embodiments, the insulating layers 154A, 154B may be integrated with either the first cover layer 140 or the second cover layer 144. For example, the first cover layer 140 may include an insulation fill or batting positioned between two films of nylon.

In manufacturing module 128 of heating unit 100, heating elements 156A, 156B and insulation layers 154A, 154B may be sealed between the first and second cover layers 140 and 144. As illustrated in FIGS. 4 and 5, the first and second cover layers 140 and 144 extend slightly beyond frames 138A, 138B and heating components 142A, 142B. This allows the first and second cover layers 140 and 144 to be sealed, such as be using an adhesive, heat welding, or another other appropriate method or combination of methods.

The embodiment shown in FIGS. 1 through 7 includes a 7 foot power cord 180 connected to the heat generating element 162A. Other cord lengths may also be implemented within the scope of embodiments of the invention. The power cord may additionally be to an incoming electrical connector 158 such as an AC power plug, bare wire connector, alligator clip connectors, a cigarette lighter plug connector or other appropriate connector for connecting the power cord to a source of power.

Notably, some embodiments may be implemented with interchangeable incoming electrical connectors. For example, embodiments may include a kit which includes module 128 of heating unit 100 with a two pin auto connector. The kit may further include a wire without an additional connector connected to a mating two pin auto connector, a set of alligator clips connected to a mating two pin auto connector, and a cigarette lighter plug connected to a mating two pin auto connector. A user can then select an appropriate incoming electrical connector. For example, a user may select the wire without an additional connector if the heating unit is to be hard wired to an electrical system, such as an automobile, boat, or other electrical system. Cigarette lighter plugs or alligator clip connectors could be selected for more temporary connectors.

Some embodiments may also include various fault protections. For example, embodiments may include an incoming electrical connector 158 which includes ground fault circuit interruption capabilities so as to make heating unit 100 suitable for use in wet or outdoor environment. Embodiments may include over current protection such as breakers or fuses. Embodiments may include arc fault circuit interruption capabilities to address problems related to fatigue of wires or crushing of wires.

Embodiments may further include provisions for grounding heating unit 100. For example, the heating unit 100 is illustrated in FIGS. 1 through 7 as including an incoming electrical connector 158 in the form an AC plug, which includes two power terminals and a grounding terminal. The power cord 180 may include three conductors, one connected to each power terminal of the incoming electrical conductor, and the third connected the grounding terminal. The two conductors connected each to a respective power terminal connect as described above to heat generating element 162A. The third conductor may be connected so as to ground heating unit 100. This may be done, for example by including an electrically conductive layer (not shown) in module 128 and/or module 130 which is electrically connected to the grounding terminal.

In an alternative embodiment, due to the electrically conductive nature of heat spreading elements 164A, 164B when a graphite based material is used for the heat spreading elements 164A, 164B, the grounding terminal may be electrically coupled to heat spreading element 164A or 164B. This may be accomplished in one example, by using a ground coupling in the form of a spade connector or other connector which passes through a protective layer of the heat spreading element so as to be in electrical contact with the conductive portions of heat spreading element 164A or 164B. In one embodiment, the ground couplings comprise planar rectangular metal connection blades that would normally be used as the hot and/or neutral connection blades of a power coupling such as a power coupling which connects to a power source. In one embodiment, ground coupling spade connector further comprises barbs configured to cut into heat spreading element 164A or 164B and engage heat-spreading element 164A or 164B such that the blade does not come loose. In alternative embodiments, the blade may be connected to heat-spreading element 164A or 164B with an adhesive that does not electrically insulate heat spreading element 164A or 164B from the blade. In addition, the plane of the blade may be placed parallel to the plane of the heat spreading element 164A or 164B such that a maximum amount of the surface area of the blade is in direct contact with heat spreading element 164A, 164B. Such a configuration may increase the contact area between the two surfaces and results in a better electrical and physical connection. Furthermore, such a configuration can leverage the lower in-plane resistivity of heat-spreading element 164A, 164B.

Additionally, some embodiments may include one or more outgoing electrical connectors 160, 164. This may be used, for example to allow chaining of modules and/or heating units together. In the example illustrated, the outgoing electrical connectors 160, 164 are connected electrically to the incoming electrical connectors 158, 162 through conductors passing through modules 128, 130. Other embodiments may allow the incoming electrical connectors 158, 162 and outgoing electrical connectors 160, 164 to be more or less proximate to each other as appropriate.

Grounding terminals of the outgoing electrical connectors 160, 164 may be electrically connected to the grounding terminals of the incoming electrical connectors 158, 162. This may be accomplished by wiring the terminals together or connecting both grounding connectors to the same grounding surface, such as a grounding layer, or to heat spreading elements 164A, 164B, as described above.

Some embodiments may further include timing circuitry such that a user can select when heating should occur. The timer may be an electronic controlled device supplied by the electrical connector 158 and may include internal switching such as relays or solid state switches for supplying power to the heat generating elements 162A, 162B.

Returning again to the description of FIGS. 4, 5, and 7, module 130 may be constructed in the same fashion as module 128. In particular, module 130 may include first and second cover layers, two frames, and two heating components. Alternatively, module 130 may exclude certain elements, such as heating components 142A, 142B, or portions of heating components 142A, 142B such as the heat generating elements 162A, 162B, the associated electrical connectors 162, 164, and/or heat spreading elements 164A, 164B. Thus, in embodiment, module 130 includes first and second cover layers, two internal frames, and an insulation layer positioned within each of the two frames. In another embodiment, module 130 also includes a heat spreading layer attached and/or positioned adjacent to each of the insulation layers. Thus, module 130 can be configured to generate heat, provide insulation, spread heat over the surface of module 130, or any combination thereof.

As described herein, lid module 112 may be fabricated in a fashion similar to modules 128 and 130. Namely, lid module 112 may include first and second cover layers, two frames, fasteners, and internal components. The size and shape of lid module 112 can be selected to correspond to the shape and size of the interior space formed by modules 128 and 130. Additionally, the internal components 150 of lid 112 can include all of the heating functionality described in connection with heating components 142A, 142B of module 128. Alternatively, internal components 150 may only include insulating and or heat spreading functionality as described with reference to module 130. In particular, some embodiments of lid module 112 may be implemented where internal components 150 include heating elements 156A, 156B along with heat generating elements 162A, 162B, and heat spreading elements 164A, 164B. Alternatively, various elements may not be included in lid module 112, including one or more of heat generating elements 162A, 162B and heat spreading element 164A, 164B.

Figure 8:
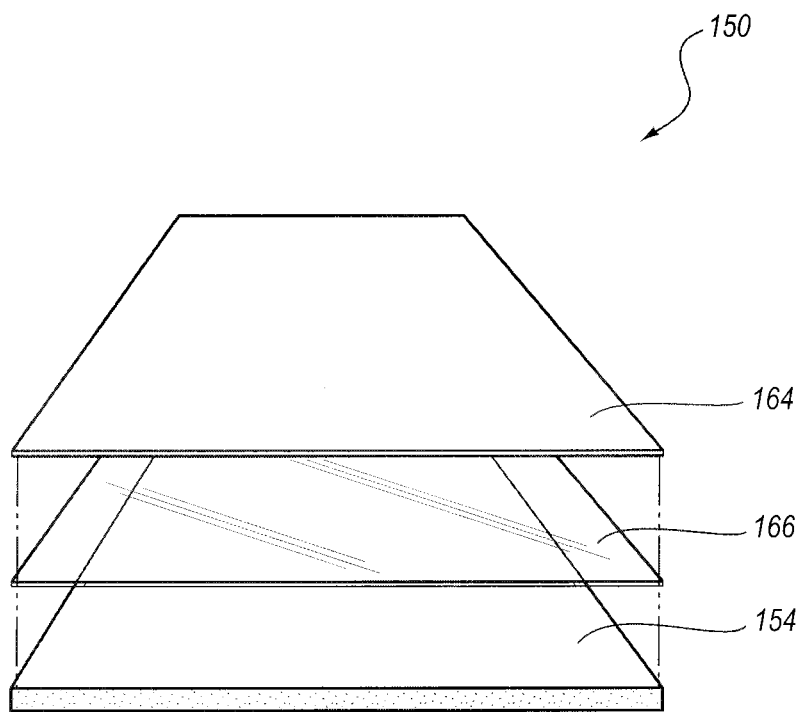
FIG. 8 is an exploded view of internal components for use in the lid module of FIG. 4.

For instance, FIG. 8 illustrates one exemplary embodiment of internal components 150 of lid module 112. In the illustrated embodiment, internal components 150 include an insulation layer 154 and a heat spreading layer 164 attached together at attachment interface 166. Insulation layer 154 can limit or prevent heat generated by heating unit 100 from escaping from interior space 114 to an environment external to heating unit 100. Heat spreading layer 164, as described above, can spread heat evenly over at least a portion of the surface of lid 112. Spreading heat over the interior surface of lid 112 can assist in evenly heating materials 102. It will be appreciated that internal components 150 can include an insulation layer, a heat spreading element, a heat generating element, or any combination thereof.

In some embodiments, lid module 112 may be additionally insulated for better heat retention. For example, lid module 112 may include double, triple, or some other ratio of insulation material in the insulation layer 154 as compared to modules 128, 130. As noted herein, lid module 112 may include flaps 126. Flaps 126 can be secured to other portions of heating unit 100 or otherwise arranged to prevent or inhibit wind from entering heating unit 100 or heat from escaping heating unit 100. In one embodiment, flaps 126 extend about six inches over other sides of heating unit 100.

As noted above, modules 128, 130, and 112 of heating unit 100 may be constructed such that the first and second cover layers of each module may include one or more fasteners 132 (see FIGS. 1-6) for hanging, securing, or connecting module 128, 130, 112 to each other, or to other heating units. In some embodiments, such as that illustrated in FIGS. 1-3A, fasteners 132 may be attached or formed into the corners of modules 128, 130, 112. In other embodiments, such as that illustrated in FIG. 3B, fasteners may be attached at other locations on modules 128, 130, 112. Additionally, fasteners 132 may be distributed about portions of or the entire perimeter of modules 128, 130, 112. In some embodiments, fasteners 132 are a hook and loop fastener such as Velcro®. For example, modules 128 may include a hook fabric on one side and module 130 may include a loop fabric on an adjacent side, such that modules 128 and 130 can be secured together. In other alternative embodiments, fasteners 132 may include grommets, snaps, straps, zippers, adhesives, or other fasteners. Further, additional objects may be used with the fasteners to accomplish fastening. For example, when grommets are used, straps or elastic cord, such as bungee cord, may be used to connect to grommets on adjacent edges of module 128 and lid 112, for example. In some embodiments, #5 grommets may be used. In other embodiments, straps may be connected to modules 128, 130, 112 and clips may be used to couple the straps together.

Heating unit 100, in one embodiment is sized to be about 4 ft×4 ft×3 ft high so as to accommodate a standard 46 inch pallet and load stored thereon. In particular, this embodiment can store approximately 48 cubic feet internally. In an alternative embodiment, the heating unit 100 is sized to be about 4 ft×4 ft×4 ft high. This embodiment has about 64 cubic feet of storage.

The modular nature of heating unit 100 also facilitates ready assembly of heating unit 100. The wall modules 128, 130 can be relatively quickly set up and secured together with lid module 112 placed thereon. Specifically, module 128 can be folded or unfolded so that walls 104 and 106 form a generally right angle with each other at hinge 116. With walls 104 and 106 so oriented, module 128 can be stood upon is edge. Similarly, module 130 can be folded or unfolded so that walls 108 and 110 form a generally right angle with each other at hinge 1186. With walls 108 and 110 so oriented, module 130 can be stood upon is edge. Walls 104 and 110 can then be secured together with fasteners 132, and walls 106 and 108 can be secured together with fasteners 132. Lid module 112 can then be placed on and, optionally, secured to modules 128 and 130.

Similarly, the modular nature of heating unit 100 facilitates the quick and ready disassembly of heating unit 100. In particular, fasteners 132 allow for modules 128, 130, and 112 to be quickly disconnected from one another. Once disconnected, modules 128, 130, and 112 can be separated and folded for storage or transport. For instance, once disconnected from each other, module 128 can be folded along hinge 116 so that walls 104 and 106 are positioned side-by-side, module 130 can be folded along hinge 118 so that walls 108 and 110 are positioned side-by-side, and module 112 can be folded along hinge 124 so that panels 120 and 122 are positioned side-by-side. The folded modules can then be stacked and stored or transported while taking up a relatively small amount of space. For example, a fully assembled 4 ft×4 ft×4 ft high heating unit 100 occupies about 64 cubic feet of space. The same sized heating unit when disassembled and folded up can take up as little as 6 cubic feet of space. Specifically, modules 128, 130, and 112 can be folded and stacked so they are about 4 ft×4 ft×4.5 in high. Being able to disassemble heating unit 100 when not in use or when being transported saves significant amounts of storage/cargo space, thus enabling additional heating units or other materials to be stored/transported.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A heating unit for use in heating one or more items, the heating unit comprising:
  a first wall module forming first and second walls of the heating unit and a second wall module forming third and fourth walls of the heating unit, the first and second wall modules being configured for selective coupling to one another to at least partially define an interior space of the heating unit, the interior space being configured to receive the one or more items, the first, second, third, and fourth walls each comprising:
- a first cover layer and a second cover layer coupled to the first cover layer;
- a rigid frame disposed between the first and second cover layers and configured to provide structural support to the wall;
- a heating component positioned between the first and second cover layers, the heating component including a heat generating element for converting electrical current to heat energy and a heat spreading component comprising a contiguous planar laminate sheet of carbon thermally coupled to the heat generating element for substantially uniformly spreading the heat energy over the wall, the heat generating element of the heating component in the third wall being selectively electrically coupleable to the heat generating element of the heating component in the second wall and being electrically coupled to the heat generating element of the heating component in the fourth wall; and
- an insulation layer positioned at one side of the heating component and configured to direct heat energy to the interior space of the heating unit; and
- a lid module configured to rest upon the first and second wall modules to cover and retain heat within the interior space of the heating unit.

2. The heating unit of claim 1, wherein the heating component of the first wall includes a receiving power connector electrically connected to the heat generating element of the first wall, the receiving power connector configured to couple to an electrical power source.

3. The heating unit of claim 2, wherein the heat generating elements of the first and second walls are electrically connected by a first wire such that electrical power received by the receiving power connector can be transferred by the heat generating element of the first wall and the first wire to the heat generating element of the second wall.

4. The heating unit of claim 3, wherein the heating component of the second wall further includes an outgoing power connector electrically connected to the heat generating element of the second wall.

5. The heating unit of claim 4, wherein the heating component of the third wall includes a receiving power connector electrically connected to the heat generating element of the third wall, the receiving power connector of the third wall configured to selectively couple to the outgoing power connector of the second wall.

6. The heating unit of claim 5, wherein the heat generating elements of the third and fourth walls are electrically connected by a second wire such that electrical power received by the receiving power connector of the third wall can be transferred by the heat generating element of the third wall and the second wire to the heat generating element of the fourth wall.

7. The heating unit of claim 1, wherein at least one of the first, second, third, and fourth walls is configured to be used as a door to access the interior space of the heating unit.

8. The heating unit of claim 1, wherein the first and second walls are pivotally coupled to one another by a hinge.

9. The heating unit of claim 1, wherein the third and fourth walls are pivotally coupled to one another by a hinge.

10. The heating unit of claim 1, wherein the heat spreading element comprises graphite.

11. A heating unit for use in heating one or more items, the heating unit comprising:
- a first wall;
- a second wall coupled to the first wall at a first hinge such that the first and second walls can pivot relative to each other and about the first hinge, the first and second walls selectively pivoting about the first hinge between a collapsed storage position and an erect assembly position;
- a third wall that can be selectively coupled to the second wall;
- a fourth wall coupled to the third wall at a second hinge such that the third and fourth walls can pivot relative to each other and about the second hinge, the third and fourth walls selectively pivoting about the second hinge between a collapsed storage position and an erect assembly position, the fourth wall selectively coupling to the first wall, wherein, when the first, second, third, and fourth walls are in the erect assembly positions and the third wall is coupled to the second wall and the fourth wall is coupled to the first wall, the first, second, third, and fourth walls cooperate to at least partially define an interior space of the heating unit, the interior space being configured to receive the one or more items, each of the first, second, third, and fourth walls comprising:
  - a rigid frame configured to provide structural support to the wall;
  - a heating component positioned within the rigid frame, the heating component including a heat generating element for converting electrical current to heat energy and a heat spreading component comprising a contiguous planar laminate sheet of carbon thermally and adhesively coupled to the heat generating element for substantially uniformly spreading the heat energy over a surface of the wall, the heat generating element of the heating component in the third wall being selectively electrically coupleable to the heat generating element of the heating component in the second wall and being electrically coupled to the heat generating element of the heating component in the fourth wall; and
  - an insulation layer positioned at one side of the heating component and configured to direct heat energy to the interior space of the heating unit; and
- a lid configured to rest upon the first, second, third, and fourth walls to cover and retain heat within the interior space of the heating unit, the lid having first and second panels which can be pivoted about a third hinge to provide access to the interior space of the heating unit.

12. The heating unit of claim 11, wherein the first, second, third, and fourth walls comprise one or more fasteners for selectively securing the first and fourth walls together and the second and third walls together.

13. The heating unit of claim 12, wherein the one or more fasteners comprise grommets, snaps, cords, straps, rope, or a combination thereof.

14. The heating unit of claim 11, wherein the lid comprises flaps arranged to prevent or inhibit wind from entering the interior space of the heating unit.

15. The heating unit of claim 11, wherein the heat spreading component is thermally isotropic in one plane.

16. A heating unit for use in heating one or more items, the heating unit comprising:
- a first module comprising:
  - first and second cover layers forming a first envelope;
  - first and second rigid frames positioned side by side within the first envelope and configured to provide structural support to the first module;
  - first and second heating components positioned within the respective first and second rigid frames, the first and second heating components being configured to convert electrical energy to heat energy and to distribute the heat energy, the heating components each comprising:
    - a heat generating element for converting electrical current to heat energy, the heat generating element of the first heating component being electrically coupled to the heat generating element of the second heating component; and
a heat spreading component comprising a contiguous planar laminate sheet of carbon thermally coupled to the heat generating element;
first and second thermal insulation layers positioned at one side of the respective first and second heating components and within the first envelope; and
a first hinge formed in the first module between the first and second rigid frames, the first hinge formed in a fashion that facilitates selective folding of the first module between a collapsed storage position and an erect assembly position in which the first and second rigid frames support the first module on an edge of the first module;
a second module comprising:
third and fourth cover layers forming a second envelope;
third and fourth rigid frames positioned side by side within the second envelope and configured to provide structural support to the second module;
third and fourth heating components positioned within the respective third and fourth rigid frames, the third and fourth heating components configured to convert electrical energy to heat energy and to distribute the heat energy, the heating components each comprising:
a heat generating element for converting electrical current to heat energy, the heat generating element of the third heating component being selectively electrically coupleable to the heat generating element of the second heating component and being electrically coupled to the heat generating element of the fourth heating component; and
a heat spreading component comprising a contiguous planar laminate sheet of carbon thermally coupled to the heat generating element;
third and fourth thermal insulation layers positioned at one side of the respective third and fourth heating components and within the second envelope; and
a second hinge formed in the second module between the third and fourth rigid frames, the second hinge formed in a fashion that facilitates selective folding of the second module between a collapsed storage position and an erect assembly position in which the third and fourth rigid frames support the second module on an edge of the second module;
one or more fasteners coupled to or formed in at least one of the first, second, third, or fourth cover layers, and configured to allow the first and second modules to be selectively connected together in a fashion such that the first and second modules can be substantially arranged into walls of the heating unit; and
a lid module configured to cover the top of and retain heat in the heating unit, the lid module comprising:
fifth and sixth cover layers forming a third envelope;
fifth and sixth rigid frames positioned side by side within the third envelope and configured to provide structural support to the lid module;
fifth and sixth thermal insulation layers positioned within respective fifth and sixth rigid frames and within the third envelope; and
a third hinge formed in the lid module between the fifth and sixth rigid frames, the third hinge formed in a fashion that divides the lid module into a first panel and a second panel, the third hinge facilitating selective folding of the lid module in a fashion which allows the first panel or the second panel of the lid module to be used as a door to access an interior space of the heating unit.

17. The heating unit of claim 16, wherein the cover layers comprise vinyl.

18. The heating unit of claim 16, wherein the insulation layers comprise closed cell foam.

19. The heating unit of claim 16, wherein the heating unit comprises a thermostat configured to regulate an operating temperature of the heating unit.

20. The heating unit of claim 19, wherein the thermostat is incorporated in a temperature controller, the temperature controller comprising:
a receptacle for receiving a receiving power connector electrically connected to the first heating component; and
a plug for electrically connecting the temperature controller to a power source.

* * * * *